US008553497B2

(12) United States Patent
Krohn

(10) Patent No.: US 8,553,497 B2
(45) Date of Patent: Oct. 8, 2013

(54) REMOVAL OF SURFACE-WAVE NOISE IN SEISMIC DATA

(75) Inventor: Christine E. Krohn, Houston, TX (US)

(73) Assignee: ExxonMobil Upstream Research Company, Houston, TX (US)

(*) Notice: Subject to any disclaimer, the term of this patent is extended or adjusted under 35 U.S.C. 154(b) by 434 days.

(21) Appl. No.: 12/994,543

(22) PCT Filed: Jun. 19, 2009

(86) PCT No.: PCT/US2009/048003
§ 371 (c)(1),
(2), (4) Date: Nov. 24, 2010

(87) PCT Pub. No.: WO2010/019314
PCT Pub. Date: Feb. 18, 2010

(65) Prior Publication Data
US 2011/0069581 A1 Mar. 24, 2011

Related U.S. Application Data

(60) Provisional application No. 61/087,938, filed on Aug. 11, 2008.

(51) Int. Cl.
*G01V 1/00* (2006.01)
(52) U.S. Cl.
CPC ............. *G01V 1/00* (2013.01); *G01V 2210/20* (2013.01); *G01V 2210/32* (2013.01); *G01V 2210/3246* (2013.01)
USPC .......................................................... 367/45
(58) Field of Classification Search
USPC ........................................ 367/43–47; 702/17
See application file for complete search history.

(56) References Cited

U.S. PATENT DOCUMENTS

| 4,556,962 A | 12/1985 | Widrow |
| 4,757,480 A | 7/1988 | Gutowski |
| 4,853,902 A | 8/1989 | Corrigan |

(Continued)

FOREIGN PATENT DOCUMENTS

| WO | WO 2007/006145 | 1/2007 |
| WO | WO 2007/041720 | 4/2007 |

OTHER PUBLICATIONS

Aki, K. et al. (1980), "Quantitative Seismology: Theory and Methods vol. I—Chapter 7—Surface Waves in a Vertically Heterogenous Medium," W.H. Freeman and Co., pp. 259-318.

(Continued)

*Primary Examiner* — Krystine Breier
(74) *Attorney, Agent, or Firm* — ExxonMobil Upstream Research Company Law Dept.

(57) ABSTRACT

The invention is a method to predict surface-wave waveforms (306) and subtract them (307) from seismic data. Prediction is done by estimating a set of surface-consistent components (transfer functions in the frequency domain or impulse responses in time domain) that best represent changes in the waveforms for propagation along the surface from source to receiver (303). The prediction uses a mathematical expression, or model, of the earth's filtering effects, both amplitude and phase, as a function of frequency. The desired surface-consistent components are model parameters, and model optimization is used to solve for the surface-consistent components. The surface-consistent components may include filter transfer functions for each source location, each receiver location, and for propagation (302) through each region (301) of the surface that exhibits lateral variation.

20 Claims, 13 Drawing Sheets

(56) References Cited

U.S. PATENT DOCUMENTS

| | | | |
|---|---|---|---|
| 4,853,903 | A | 8/1989 | Linville, Jr. et al. |
| 4,858,199 | A | 8/1989 | Griffith |
| 4,890,264 | A | 12/1989 | Crews et al. |
| 5,060,202 | A | 10/1991 | Meek et al. |
| 5,191,526 | A | 3/1993 | Laster et al. |
| 5,237,538 | A | 8/1993 | Linville, Jr. et al. |
| 5,309,360 | A | 5/1994 | Monk et al. |
| 5,781,503 | A | 7/1998 | Kim |
| 5,920,828 | A | 7/1999 | Norris et al. |
| 6,021,379 | A | 2/2000 | Duren et al. |
| 6,236,620 | B1 | 5/2001 | Schultz et al. |
| 6,266,620 | B1 | 7/2001 | Baeten et al. |
| 6,330,512 | B1 | 12/2001 | Thomas et al. |
| 6,446,008 | B1 * | 9/2002 | Ozbek ............... 702/17 |
| 6,519,205 | B1 | 2/2003 | Baeten et al. |
| 6,651,007 | B2 * | 11/2003 | Ozbek ............... 702/17 |
| 6,668,228 | B1 | 12/2003 | Ozbek et al. |
| 6,738,715 | B2 | 5/2004 | Shatilo et al. |
| 6,865,487 | B2 | 3/2005 | Charron |
| 7,436,734 | B2 | 10/2008 | Krohn |
| 7,864,628 | B2 * | 1/2011 | Sitton et al. ............... 367/24 |
| 2007/0104028 | A1 | 5/2007 | Van Manen et al. |

OTHER PUBLICATIONS

Aki, K. et al. (1980), "Quantitative Seismology: Theory and Methods vol. I," W.H. Freeman and Co., p. 173.

Berkhout, A.J. (1987), "Applied Seismic Wave Theory," Elsevier Science Publishers, p. 142.

Blonk, B. et al. (1996), "Removal of scattered surface waves using multicomponent seismic data," *Geophysics* 61(5), pp. 1483-1488.

Curtis, A. et al. (2006), "Seismic interferometry—turning noise into signal," The *Leading Edge*, pp. 1082-1092.

Delprat-Jannaud, F. et al. (2005), "A fundamental limitation for the reconstruction of impedance profiles from seismic data," *Geophysics* 70(1), pp. R1-R14.

Ernst, F.E. et al. (2000), "Tomography of dispersive media," *J. Acoust. Soc. Am* 108(1), pp. 105-116.

Ernst, F.E. et al. (2002), "Removal of scattered guided waves from seismic data," *Geophysics* 67(4), pp. 1240-1248.

Gibson, B. et al. (1984), "Predictive deconvolution and the zero-phase source," *Geophysics* 49(4), pp. 379-397.

Halliday, D.F. et al. (2007), "Interferometric surface-wave isolation and removal," *Geophysics* 72(5), pp. A69-A73.

Herman, G.C. et al. (2006), "Predictive removal of scattered noise," *Geophysics* 71(2), pp. V41-V49.

Krohn, C.E. (1984), "Geophone ground coupling," *Geophysics* 49(6), pp. 722-731.

Liu, X. (1999), "Ground roll suppression using the Karkunen-Loeve transform," *Geophyhsics* 64(2), pp. 564-566.

Park, C.B. et al. (1999), "Multichannel analysis of surface waves," *Geophysics* 64(3), pp. 800-808.

Perelberg, A.I. et al. (1994), "Applications of seismic polarization analysis," *Geophysics* 59(1), pp. 119-130.

Regone, C.J. (1998), "Suppression of coherent noise in 3-D seismology," *The Leading Edge*, pp. 1584-1589.

Trantham, E.C. (1994), "Controlled-phase acquisition and processing," *SEG Expanded Abstracts* 13, pp. 890-894.

Xue, Y. et al. (2007), "Surface wave elimination by interferometry with nonlinear local filter," *SEG Expanded Abstracts* 26, pp. 2620-2624.

Ziolkowski, A. (1991), "Why don't we measure seismic signatures?," *Geophysics* 56(2), pp. 190-201.

International Search Report and Written Opinion, dated Sep. 2, 2009, PCT/US2009/048003.

* cited by examiner

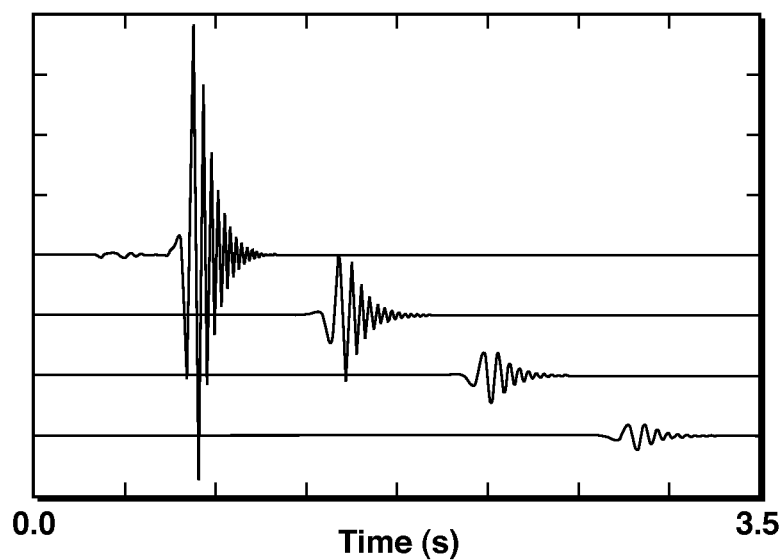
FIG. 8
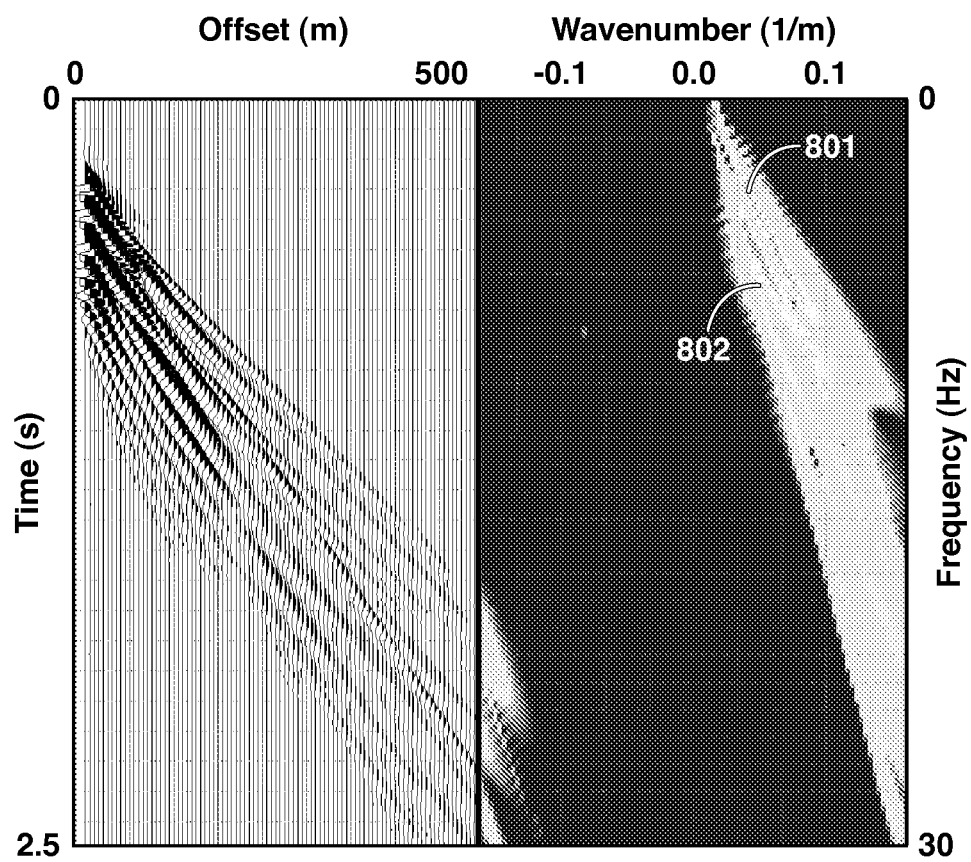
FIG. 9A  FIG. 9B

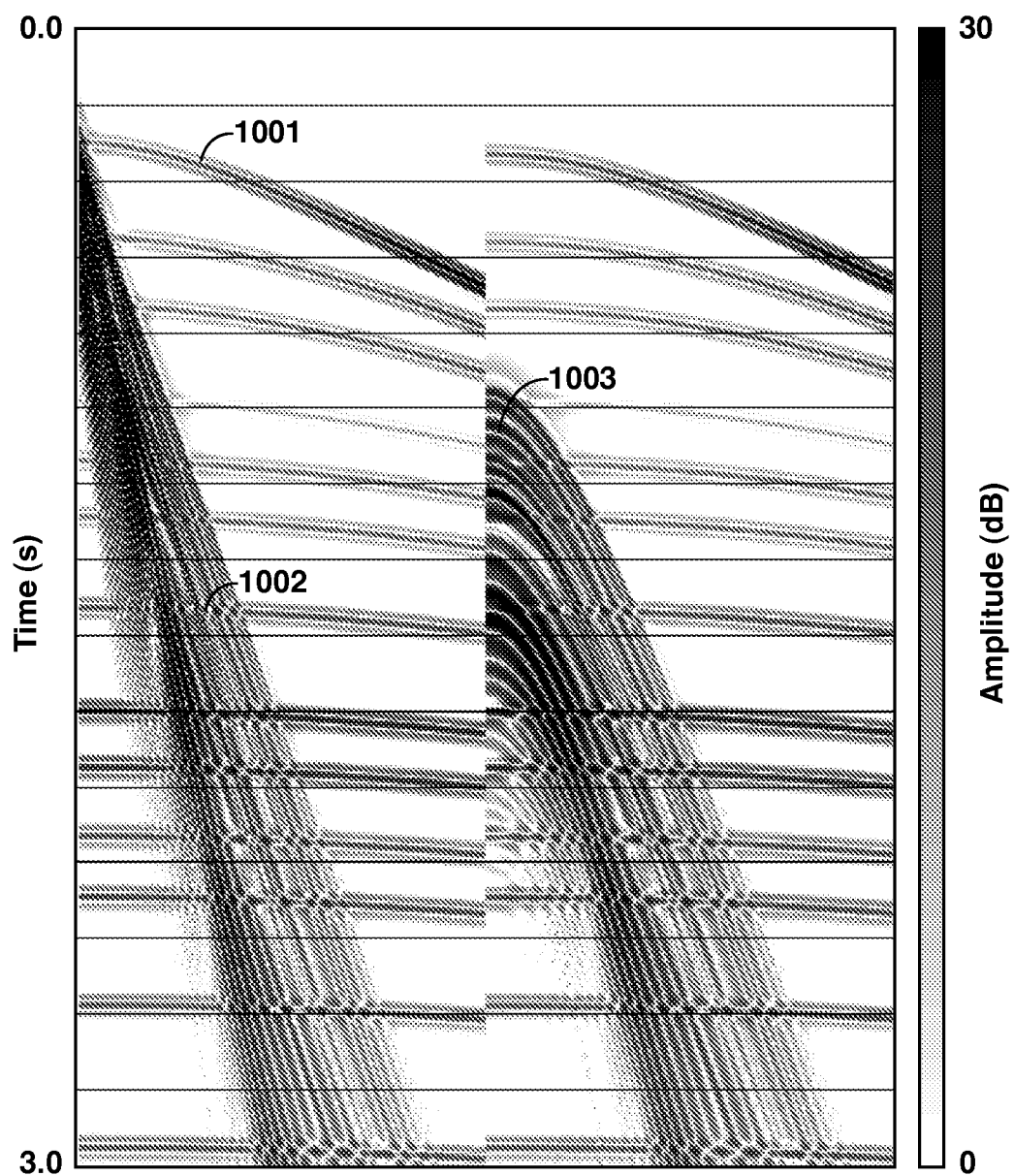
FIG. 10A     FIG. 10B

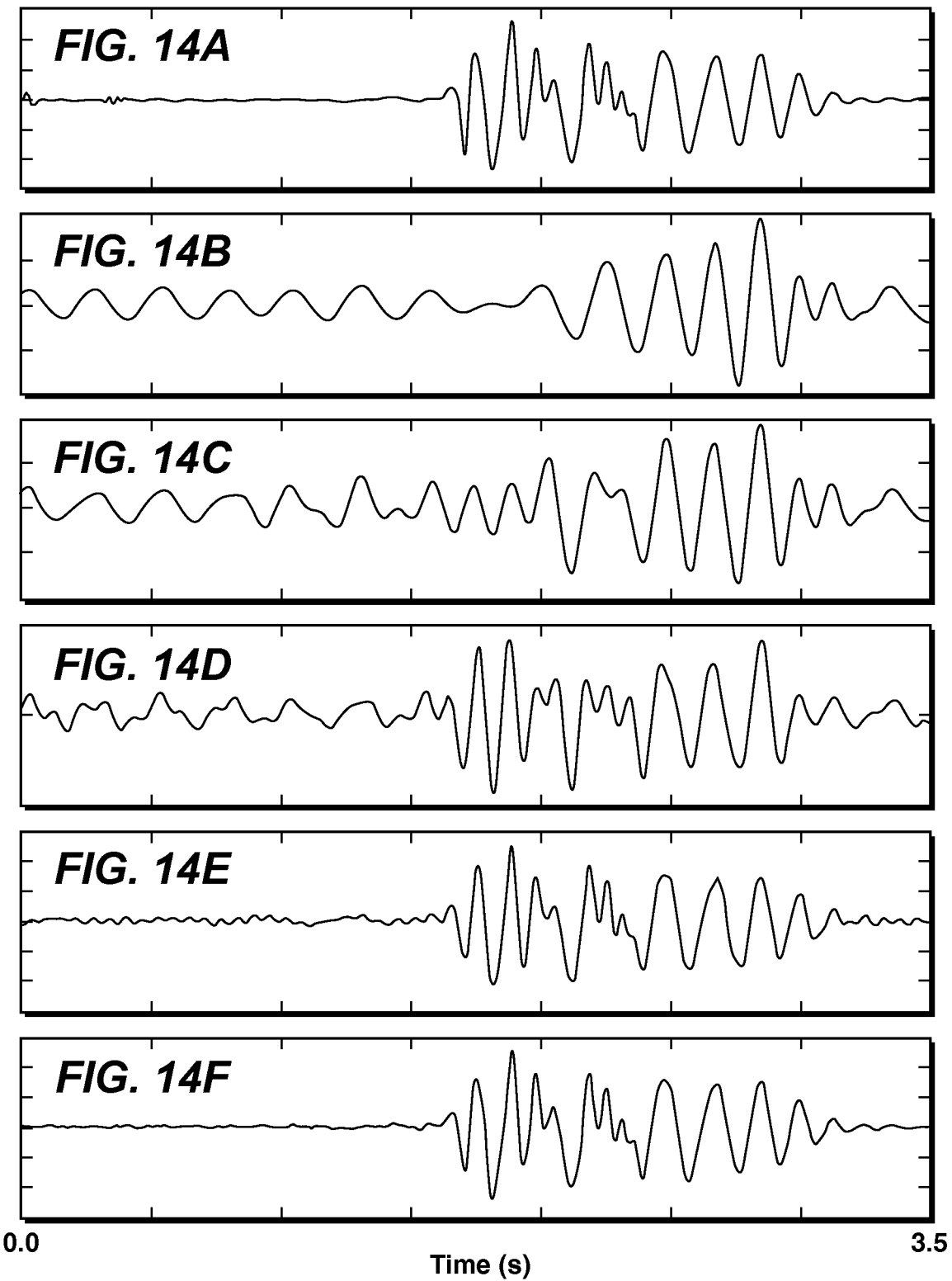

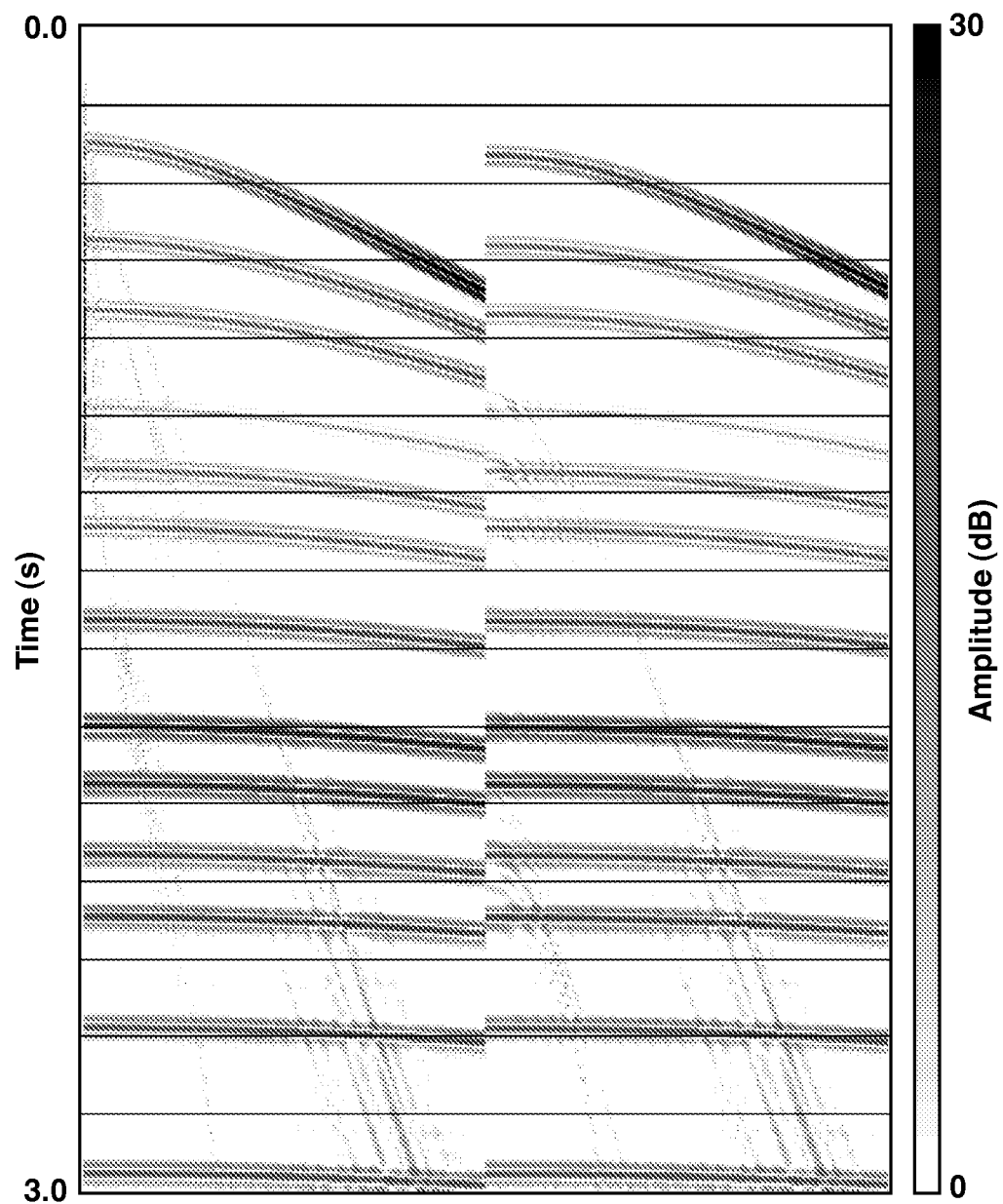
*FIG. 15A*  *FIG. 15B*

REMOVAL OF SURFACE-WAVE NOISE IN SEISMIC DATA

CROSS REFERENCE TO RELATED APPLICATIONS

This application is the National Stage entry under 35 U.S.C. 371 of PCT/US2009/048003 that published as WO 2010/019314 and was filed on 19 Jun. 2009, which claims the benefit of U.S. Provisional Application No. 61/087,938, filed on 11 Aug. 2008, each of which is incorporated by reference, in its entirety, for all purposes.

FIELD OF THE INVENTION

This invention relates generally to the field of seismic prospecting and, more particularly to seismic data processing. Specifically, the invention is a method for using seismic data to predict the waveforms for surface-wave noise and then subtracting them from the seismic data where they overlie the deep reflected returns and constitute noise when the data are processed for determining the physical structure or a physical property of a subsurface earth region.

BACKGROUND OF THE INVENTION

Seismic data recorded for the purpose of imaging subsurface reflections are contaminated by seismic waves that travel along the earth's surface or along the ocean bottom. These high-amplitude noises, called surface waves, guided waves, or ground roll, must be removed so that the weaker reflections can be imaged or used to interpret physical structure or properties of the earth. The conventional approach is to design and apply digital signal-processing filters with the goal of reducing the noise but retaining the signal. There are many such filters, some are single-trace filters and some are multi-trace filters, but they all exploit a difference in the digital recordings for surface-wave noise and for reflection signals. Unfortunately, there is not a single characteristic that uniquely distinguishes surface waves and reflections, and such filters remove some reflection signal along with the noise. In addition, the performance of signal-processing filters degrades when the behaviors of the surface-waves are complex and change laterally over the survey area and when the distances between receivers are too long or too irregular as is typically found with 3D seismic surveys.

The effect of removing part of the reflections or leaving residual noise is to limit the ability to use the seismic data for determining the detailed physical structure and properties of a subsurface earth region. In particular, the ability to use the data for assessing the hydrocarbon potential of a prospective reservoir and for optimizing the well placement for extraction of the hydrocarbons is limited. One of the common problems from inadequate surface-wave removal is the lack of good amplitude fidelity of the processed seismic data. Amplitude attributes of processed data can be used to show subtle changes in subsurface structure or properties due to varying rock type or bed thickness and the presence of small channels or faults. In addition, the reflection amplitudes as a function of reflection angle can be to determine reservoir properties, such as porosity, shale content, or the presence of oil or gas. These methods include AVO (amplitude versus offset) analysis and inversion for prestack or limited-offset stack data. Such methods are typically more successful for data acquired in deep marine areas, where surface wave noise is less of a problem, than for data acquired on land or in shallow marine areas. For the later, surface wave noise can mask the reflection amplitudes and conventional processing methods cannot remove the noise without adversely affecting the integrity of amplitudes of the reflections. Sophisticated AVO inversion methods for reservoir property estimation, in particular, need high-integrity low-frequency reflection amplitudes at different source- and receiver offset distances (reflection angles) and are particularly affected by poorly mitigated surface wave noise.

Conventional Filtering Methods

The simplest single-trace filter used to mitigate ground roll or surface waves is a low-cut frequency filter. Because ground roll is typically lower in frequency than reflectors it can be removed by filtering out the lower frequencies in the recordings. Unfortunately, the low-frequency components of the reflections are also removed, and along with them, the ability for deep imaging and for sophisticated reservoir property analyses. More recently, polarization filters have been developed using earthquake-seismology methods. Polarization filters (Pinnegar, PCT Patent Application Publication No. WO 2007/006145) require 3-component receivers and exploit the fact that the relationship between vertical and horizontal components, or the polarization, is different for Rayleigh waves (the fundamental low-velocity surface wave) than for reflections. However, the success of polarization filtering for seismic imaging applications is limited because the surface-wave energy does not consist of only simple Rayleigh waves but rather a mix of Rayleigh waves and other higher-order, faster modes of surface waves that do not have distinctive polarization characteristics compared to signal. Unlike earthquake seismology, the source and receiver distances are too short for the wave types to separate in time. The ground-roll waveforms consist of the interference of several different types of surface waves along with converted waves and reflections. Such interference makes the computation of polarization ambiguous and limits the ability to remove surface waves and retain reflections.

The majority of ground-roll mitigation methods are multi-trace filters that exploit velocity differences; surface waves are typically much slower in velocity than P-wave reflections, and they have more time move out from trace to trace. Different methods exploit this difference by velocity filtering, FK filtering, adaptive filtering, or beam forming (see, for example, U.S. Pat. No. 6,651,007 to Ozbek). A problem with such methods is that they require a sufficiently short distance between each of the receivers so that the recorded ground roll is not aliased, i.e. so that the ground roll is adequately sampled. If the distance is too large, then the apparent ground-roll velocity is ambiguous at some frequencies, and both ground roll and reflectors are removed.

Additional problems arise with multi-trace velocity filters because of the complexity and variability of the near-surface and surface-wave behaviors. Because the near-surface properties change rapidly with depth, the ground-roll velocity is dispersive, and the surface-wave velocity changes with frequency. In addition, multiple modes of the ground-roll exist each with different velocity and dispersion characteristics. Velocity filters must handle a range of velocities or be run multiple times with different velocities. With broader filters or multiple passes, more reflection energy can be harmed. Furthermore because of attenuation, the ground-roll amplitude is decreasing rapidly with larger source to receiver distances, and the multi-trace filter performance is reduced. For example, with phase-match filtering (U.S. Pat. No. 5,781,503 to Kim), the ground-roll noise for all offsets is aligned with a specific velocity dispersion relation, and a horizontal averaging filter is used to extract the ground roll and leave reflections. Because the ground-roll changes amplitude laterally, not all of the ground-roll is extracted by averaging a group of traces. Finally, the properties of the near-surface and thus the velocities of the ground roll can change laterally requiring changing filter parameters and limiting the effectiveness of the filters. Such velocity changes can be difficult to estimate, because two-dimensional transforms, such as $f$-$k$ transforms or radon transforms, effectively average over all of the receiver traces in the gather.

Inverse Methods

In two published papers, Ernst et al. ("Tomography of dispersive media" *J. Acoust. Soc. Am.* 108, 105-116 (2000); and "Removal of scattered guided waves from seismic data," *Geophysics* 67, 1240-1248 (2002)) model and then predict both direct and scattered surface waves using inversion. The surface-waves are subtracted from the data. They make a number of approximations and thus various corrections are needed. In addition, the surface-wave is removed by adaptive subtraction with a final trace-by-trace phase and amplitude adjustments. The results on field data are not substantially better than standard $f$-$k$ filtering (see the 2002 Ernst et al. paper). The prediction is done in two steps. First a tomographic inversion is used to invert generalized traveltimes to obtain a laterally-varying phase-velocity field. Then a second inversion is done to find locations of scatterers. The inversions are done only for kinematic effects, i.e. assuming acoustic velocities, and amplitudes (dynamic effects) are not directly included within the tomographic method.

The primary assumption and limitation in the Ernst tomographic method is that it must use a time window with only one ground-roll mode. This requires that the source and receivers be sufficiently far apart so that the modes are well separated in time. This condition is met in earthquake seismology, but is not the case for seismic imaging applications. The presence of other events, such as other surface-wave modes, will distort the phase-velocity estimation. Another simplification is the use of generalized traveltimes, which involves computing the derivative of the phase of the data and problems with phase unwrapping. The solution is nonunique and needs more a priori information. Their method to obtain the a priori information is to obtain a phase correction by back propagating all the receivers to the source position, stacking and maximizing the semblances, ignoring receiver coupling and lateral variations. Next they solve for the source waveform by back propagating all traces to the source and averaging the traces, ignoring variable attenuation. Finally for field data, they estimate a single attenuation quality factor, independent of frequency and lateral position. Next the data are used to invert for locations of scatters, the resulting scattered waves predicted and adaptively subtracted from the data. Assuming only one mode, they sequentially estimate the parameters for laterally varying propagation velocities, a source-phase correction, source wavelet spectra, and a constant attenuation quality factor and scattering locations.

Interferometry Methods

Recently it has been postulated that interferometric methods might be used to estimate the full wavefield of the surface-wave and subtract it from seismic data (U.S. Patent Application Publication No. 2007/0104028 by Van Manen et al.; and Xue et al., "Surface wave elimination by interferometry with nonlinear local filter," *SEG Expanded Abstracts* 26, 2620-2624 (2007)). The interferometric operations are simple to compute. They involve cross correlating the data from a pair of receivers and stacking over all sources. The action of cross correlation is equivalent to convolution or filtering with the time reverse of one of the signals. Theoretically, the Green's function between two receiver stations is obtained, the Green's function being a seismogram with a delta function as the source at one of the receiver stations. However, the theory is only for a lossless earth (no attenuation), and for sources that completely surround the object (Curtis et al., "Seismic interferometry—turning noise into signal," *The Leading Edge* 25, 1082-1092 (2006)). When these conditions are not met, the amplitude (dynamic) part of the wavefield will not be correct. Another part of the limitation are the requirements for source locations such as on a perimeter of the survey or so that they are at points of stationary phase for the surface waves but not for reflectors. The latter is required for distinguishing surface-waves and reflections. There are a number of issues with this method that have not been resolved, particularly with 3D data.

Thus there remains a need to correct the seismic data by predicting and subtracting surface-waves or ground roll from seismic data without harming reflections and without requiring fine and uniform spacing of sources or receivers. The method should encompass the full complexity (multimodal, laterally variant, etc.) of surface waves and both kinematic (velocity) and dynamic (amplitude) effects. It is also desirable that problems, such as computational intensity, non-linearity, non-uniqueness and non-physical approximations associated with solving for a full earth model as function of depth, be avoided. The corrected data should have good fidelity low frequency reflection amplitudes and be suitable to be used for determining the physical structure or physical properties of a subsurface region. The present invention satisfies these needs.

SUMMARY OF THE INVENTION

In one embodiment, the invention is a method for determining physical structure or a physical property of a subsurface earth region from seismic survey data by removing surface-wave noise from seismic data traces, said data traces corresponding to at least one source location and a plurality of receiver locations in a seismic survey of the subsurface region, said method comprising:

(a) dividing a near-surface part of the subsurface region into one or more cells;

(b) simultaneously solving for at least two types of surface-consistent components of the seismic traces, wherein a surface-consistent component characterizes filtering effects either of propagation of a seismic surface wave mode across a cell (a propagation filter), or due to generation of surface wave energy at a source location (a source filter) or due to receiving of surface wave energy at a receiver location (a receiver filter), and wherein a "type" of surface-consistent component is one of (i) a propagation filter for one surface wave mode, evaluated at all cells crossed by any of the seismic traces; (ii) a source filter, evaluated at all source locations for the seismic traces, or (iii) a receiver filter, evaluated at all receiver locations for the seismic traces; and (c) computing a surface-wave waveform using said surface-consistent components;

(d) transforming the seismic data by subtracting or adaptively subtracting or adaptively subtracting the computed surface-wave waveform from the seismic data traces; and (e) using the seismic data after surface-wave noise removal to determine physical structure or a physical property of a subsurface earth region of the subsurface earth region.

BRIEF DESCRIPTION OF THE DRAWINGS

The present invention and its advantages will be better understood by referring to the following detailed description and the attached drawings in which:

FIG. 8 shows the predicted waveform output computed from the components of FIGS. 7A-D, which can be compared with the corresponding input seismic data of FIG. 6;

FIGS. 9A-B show the trace data (9A) and $f$-k spectrum (9B) for a full wave-equation computer simulation of surface waves for 20 thin earth layers over a half space, wherein interference of up to 6 ground-roll modes can be seen;

FIGS. 10A-B show a 3D shot gather plotted as absolute amplitude in dB for a full wave-equation computer simulation of a 20-layered near-surface model plus deeper reflectors, wherein 10A shows data from a receiver line inline with the shot, and 10B represents a receiver line offset with the shot;

FIGS. 14A-F show one actual data trace (14A) from FIG. 12, and computed predictions of that trace in which the predicted waveform output has been limited to one (14B), two (14C), three (14D), four (14E) and six (14F) of the modes; and FIGS. 15A-B display the data of FIGS. 10A-B after removal of predicted surface-wave waveforms by the present inventive method.

The invention will be described in connection with its preferred embodiments. However, to the extent that the following description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The invention is a method to predict surface-wave waveforms and subtract them from the seismic data. Prediction is done by estimating a set of surface-consistent transfer functions in the frequency domain (or impulse responses in time domain) that best represent changes in the waveforms for propagation along the surface from source to receiver. There are no reflections in the estimate, and thus they are not damaged. The method avoids problems with conventional methods, which require fine spatial sampling and which assume simple ground-roll behavior without lateral changes.

The prediction uses a mathematical expression or model, which is based on the physics of surface-wave propagation but does not include the full Green's function solution. The model is not an earth model of seismic properties as a function of depth; instead it is a model of the earth filtering effects, both amplitude and phase, as a function of frequency. Model optimization is used to solve for the surface-consistent model parameters that best represent the recorded seismic data waveforms and changes in the waveform as the surface waves propagate along the earth's surface from the sources to the receivers. The parameters relate to individual components; alternatively called filter transfer functions, for each source location, each receiver location, and propagation through each region of the surface. The model parameters may include multiple modes of the surface-wave and surface-consistent lateral variations.

Figure 1:
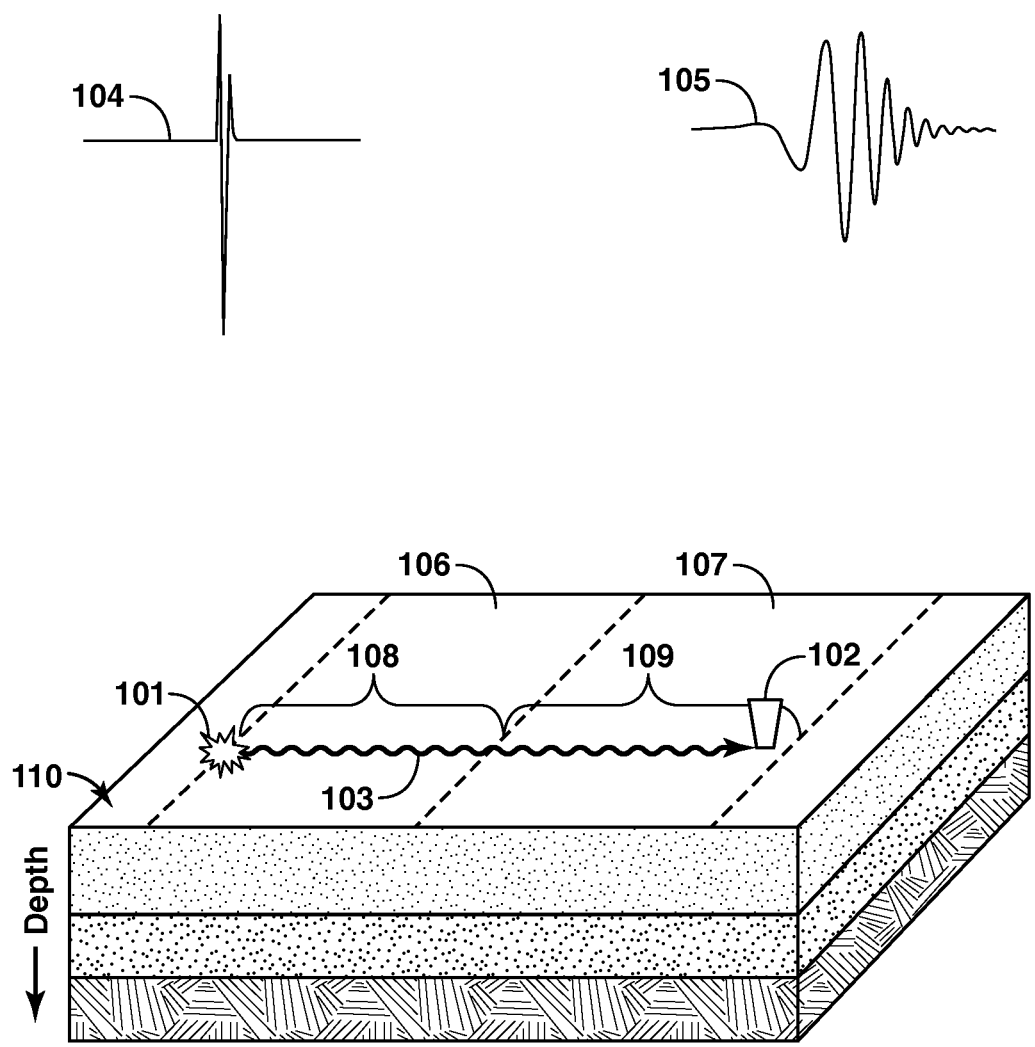
FIG. 1 is an illustration of the physical processes that affect the waveform as surface waves propagate from a source to a receiver along the surface of the earth.

One characteristic, besides ray path differences, that distinguishes surface waves from other seismic waves (such as down-going waves that reflect from interfaces) is their waveform. The waveforms of surface waves are high amplitude, low-frequency, and oscillating. On the other hand, the source wavelet is typically a high-frequency pulse or wavelet of short duration. The physical processes for this change in waveform are illustrated in FIG. 1, which shows a piece of a layered earth 110. As a mode of the surface wave propagates from a source located at the surface position 101 to a receiver located at the surface position 102 along the surface of the earth (raypath 103), it undergoes considerable earth filtering, changing from the short duration pulse of the source 104 to the more oscillatory low-frequency waveform of the surface wave 105. The surface wave is delayed and attenuated. The further the distance of propagation 103 the greater is the change. Given an estimate of the source waveform 104 and the recorded output 105, this change can be quantified by computing a transfer function for each trace. This may be called the total trace transfer function, and it characterizes the total earth filtering that results in the change of the waveform from that generated at the source to that recorded at the receiver.

Filters are commonly characterized by their transfer functions or their impulse responses. The transfer function is defined as the division in the frequency domain of the output of the filter by the input of the filter: For the seismic acquisition in FIG. 1, the transfer function T($f$) is $$T(f) = \frac{\text{output}(f)}{\text{input}(f)} = \frac{D(f)}{S(f)} \quad (1)$$

where D($f$) is the Fourier transform of the data trace 105 and S($f$) is the Fourier transform of the source wavelet 104. Equivalently, the transfer function can be obtained by cross correlating the wavelet and the data trace and dividing by the autocorrelation of the source wavelet.

$$T(f) = \frac{S^*(f)D(f)}{S^*(f)S(f)}, \quad (2)$$

where the asterisk indicates the complex conjugate. The transfer function is complex; it must include both amplitude and phase or real and imaginary parts to fully characterize the filtering effects. Computing the inverse Fourier transform yields the impulse response of the filter. The transfer function and the impulse response are equivalent characterizations in the frequency and time domains, respectively.

It is well known that individual linear filters can be convolved together (or multiplied together in the frequency domain) to yield a combined filter. It can be seen in FIG. 1 that the overall effect on the waveform of the surface-wave is composed of different physical processes, each associated with a surface location or region. For example, the coupling of the source energy into a ground-roll mode at position 101, propagation across region 106, propagation across region 107, and coupling of the receiver to the ground at position 102. Furthermore, the filtering from propagation across region 106 should be a function of the distance traveled 108 across region 106 and the filtering from propagation across region 107 should be a function of the distance traveled 109 across region 107. The filtering for propagation effect includes the effect of delay or velocity as a function of frequency (dispersion) and amplitude decay as a function of frequency. Thus for the one surface-wave mode, the overall trace transfer function T(f) can be decomposed into individual transfer functions or filters for each of the above physical processes and distances, or $$T(f) = T_{101}(f)T_{106}(f,d_{108})T_{107}(f,d_{109})T_{102}(f). \quad (3)$$

Using Equations 1 and 3, a model expression M(f) can be derived that represents the recorded ground-roll waveform:

$$M(f) = S(f)T_{101}(f)T_{106}(f,d_{108})T_{107}(f,d_{109})T_{102}(f). \quad (4)$$

Equation 4 is a model of the waveform for a single ground-roll mode. It is further assumed that the data are composed of a linear superposition of multiple modes. Also, it is assumed initially that the individual modes do not interact or are coupled. Therefore for N modes, a model of the complex ground-roll waveform can be represented as $$M(f) = S(f) \sum_{j=1}^{N} T_{101,j}(f)T_{106,j}(f, d_{108})T_{107,j}(f, d_{109}), \quad (5)$$

$$T_{102,j}(f),$$

where the sum is over all different modes j=1 to N. The number of modes N within the seismic frequency band is typically small, on the order of 2-6.

In Equation 5, the individual physical processes are represented as transfer functions or filters in the frequency domain. They are complex, and include both amplitude and phase or real and imaginary parts as function of frequency. A number of different processes can be included in a model expression. Some of these are known or can be measured. For example, one filter is that of the recording system. The impulse response of the recording system can be measured by one skilled in the art. Another might be the instrument response of the sensors, which can be obtained from the manufacturers. A third is the amplitude spreading function, which is known to be inversely proportional to the square root of the total source to receiver distance for each trace. It may be useful to lump several related processes into one term. For example, if there is a receiver array, the array effects could be lumped with a term for receiver coupling. In both cases, they are related to a specific receiver surface location. Also it may be useful to include one term that can be assumed to be known, and then have a second variable correction term. For example, an average source wavelet could be estimated, and then the source coupling term could include both coupling and shot-to-shot variations of the wavelet.

It is important to note that the filters that characterize the individual physical processes do not explicitly need a term related to the depth of the earth or to the change of seismic properties as a function of depth. The interaction of the surface-wave with the earth properties is captured in the frequency dependence of the filters. For example, the propagation terms could include a velocity parameter. It is known that high-frequency components of the surface waves have short wavelengths and are confined to the shallow part of the earth. The shallowest layers have very low velocities, and thus the velocities of the high-frequency components of the surface-wave are slow. On the other hand, the lower frequency components have long wavelengths and sample deeper parts of the earth. These deeper parts are typically faster layers, and thus the low-frequency components are fast. Because of the increasing velocity with depth, surface waves are naturally dispersive, i.e. their velocity changes with frequency. It is an assumption of the present invention that it is sufficient to characterize the changes, i.e. velocity changes, with frequency and that the media property values as a function of depth are not required. In another example, it is well known that the ground-roll amplitude decreases if the source is buried more deeply and that amplitudes of the ground-roll modes are controlled by resonances within the layer structure of the earth. For this invention, it is sufficient to characterize how the source terms change with frequency, and the detailed layering and source depth are not required.

Figure 2:
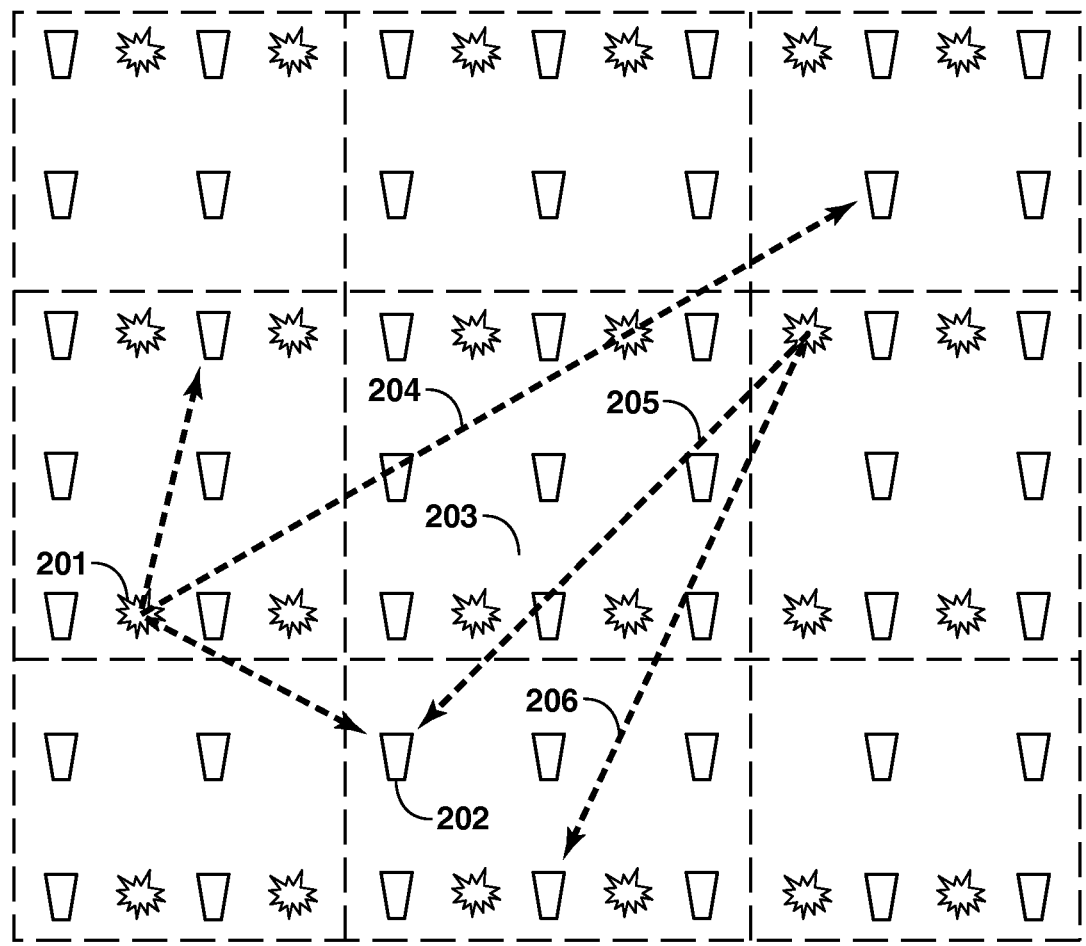
FIG. 2 is a diagram of a small part of a seismic survey in map view showing the location of sources and receivers and the division into regions or cells, and showing example raypaths from sources to receivers across different regions.

For a 2-D or 3-D seismic survey, this invention uses the redundancy of data traces, which have different raypaths and source-receiver distances, to decompose overall changes in ground-roll waveform into the individual surface-consistent components or filters that represent the individual physical processes. This use of data redundancy is illustrated with FIG. 2 for 3-D data. FIG. 2 shows a small section of a possible 3-D seismic survey in map view. In the section shown, there is a source, whose surface location is labeled 201. The source may actually be located below the surface in a shot hole. In the diagram, there are 24 such sources, each symbolized with a sun burst. There are also 49 receivers marked by a trapezoid, one of which is labeled 202. Assuming that recordings are made for each receiver each time a source is fired, then 24×49 or 1176 data traces are available. For this invention, the survey area is divided up into regions or cells. In this case, dashed lines show rectangular cells and the middle one is labeled 203. Each source and receiver pair is connected by a raypath, which on first approximation can be considered a straight line. Only a few raypaths are shown, such as 204, 205, 206, and theses three each sample region 203 with different travel distances. Assuming we have only one mode of surface-wave, then at each frequency we can use the data traces in the frequency domain to solve for the unknown component surface-consistent transfer functions. In this example for one mode, the unknowns include the 24 source coupling terms, 49 receiver coupling terms, and 9 propagation terms (the nine discrete cells) or 82 unknowns. Since we have 1176 pieces of data and 82 unknowns, the problem is over determined. If we have two modes, then the there could be 164 unknowns. It is a key part of this invention that the different unknowns related to different physical processes are determined simultaneously. There are 49 traces that have information about the source at 201, there are 24 traces that have information about receiver 202 and there are at least 460 raypaths across region 203, each of which will be weighted by a different path length across region 203. Those experienced in the art will recognize this problem as a 2D straight-ray tomography problem for the surface with the addition of source or receiver terms.

The present inventive method uses a model expression with parameters that characterize the effects of the important physical processes and a cost function that indicates the goodness of fit between the data and the model expression. It is helpful to include as many known effects, i.e. the recording instrument response, as possible. Some components may not be important for a particular acquisition and could be neglected. For example, if single receivers are used and they are generally well coupled to the ground, coupling may be neglected or replaced with a simple scalar. At a minimum the parameters should be at least two in number, for example a term for propagation through one region and a source term for energy partition into a ground-roll mode. The cost function for a least-squared optimization (for example) is the sum over the number of traces of the square of the difference between the actual data and the model expression for each trace. The sum is over all the data traces used in solving for the parameters. The cost function can be expressed in the frequency domain, in the time domain, or in some transform domain, include ƒk, radon, wavelet, Gabor, complex trace, Hilbert, and others that skilled practitioners will know of. Also a filter can be applied such as a cross-correlation filter to both the data and the model. In addition, the seismic recordings can be processed with interferometric methods from either active or passive sources. Preferably, the frequency domain is used and the cost function is related to the difference between both real and imaginary representations, i.e. the amplitude and phase representations of the data and model expression. An example cost function using real and imaginary parts is $$\min = \sum_{i=1}^{Ntrace} \left[ |\text{real}(D_i(f, sx, sy, rx, ry)) - \text{real}(M_i(f, sx, sy, rx, ry, \vec{T}))|^2 \right] + \sum_{i=1}^{Ntrace} \left[ |\text{imag}(D_i(f, sx, xy)) - \text{imag}(M_i(f, sx, sy, rx, ry, \vec{T}))|^2 \right], \quad (6)$$

where the symbol $\vec{T}$ is a vector composed of all the individual component transfer functions ($T_1(f)$, $T_2(f)$, $T_3(f)$, etc.). The vector values $\vec{T}$ represent the model parameters and are determined by minimizing the square of the differences between the model trace $M_i(f,\vec{T})$ and the data trace $D_i(f)$ summed over the number of traces $N_{traces}$. Equation 5 uses a power of 2 for the differences, which is a least squares optimization problem, but other powers, called norms, may be used such as a power of 1, the L1 norm. There are many different methods, called model optimization methods, to solve for model parameters that best match data. All are within the scope of the present inventive method.

Method Steps

Figure 3:
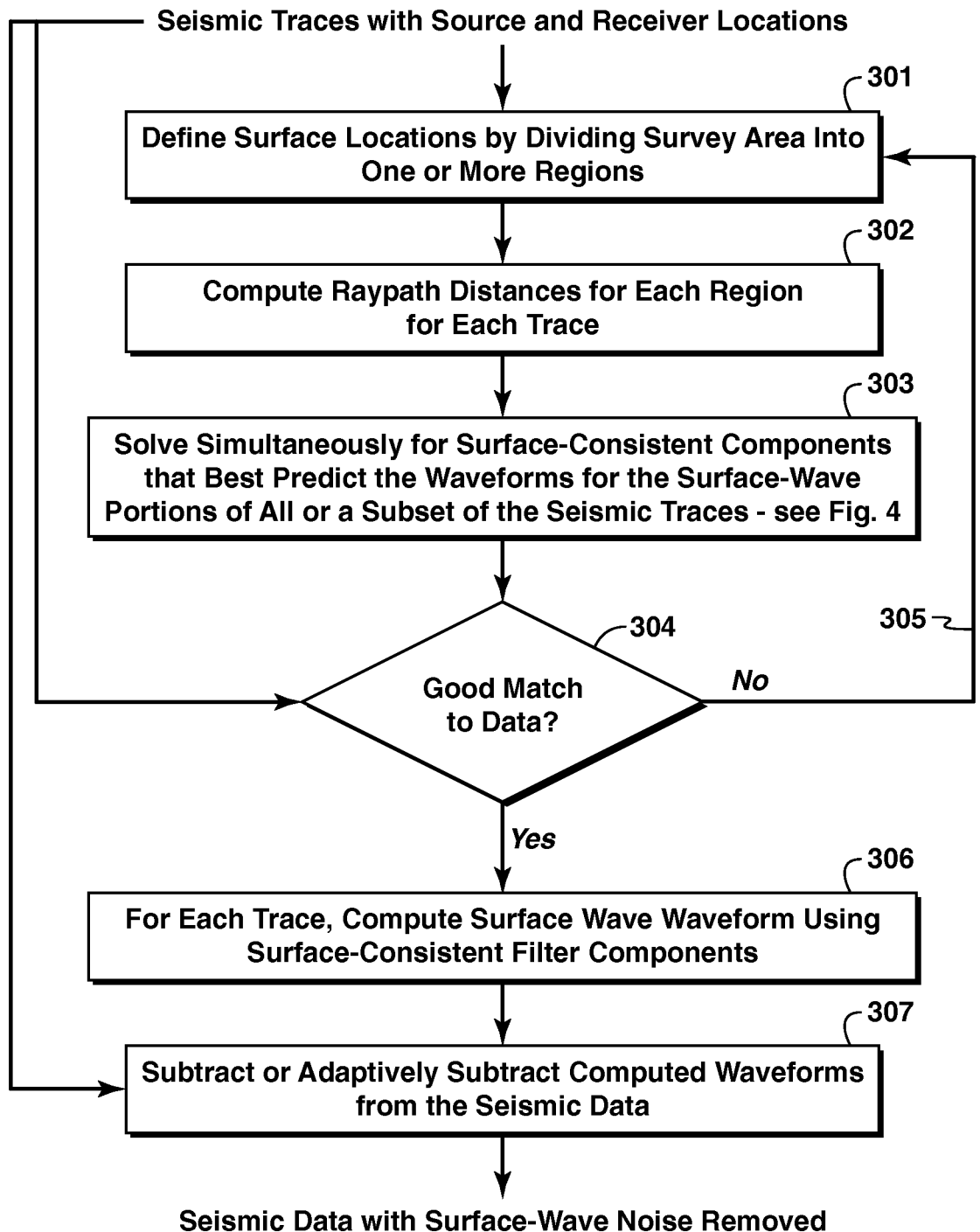
FIG. 3 is a flow chart of basic steps in one embodiment of the present inventive method.

The basic steps in one embodiment of the present inventive method are indicated in the flow chart of FIG. 3. The method requires seismic data traces and the source and receiver locations for each trace. The traces may be single-vector component or multi-vector component traces, where here the words vector component refer to detector directionality. In step 301, the surface locations for the propagation terms are defined. This can be done by dividing the survey area into one or more regions such as the cells like 203 in FIG. 2. It may be useful to start with big regions, and then subdivide them with later iterations (see step 305). The regions can be regular or irregular. For regular grids, it may be based on the 3D seismic processing grid. Alternatively, the grid can be chosen from other information, such as geological features, soil types, elevation, or velocity and frequency analyses of the ground-roll modes. In step 302, the raypath distances are computed across each region for each trace and stored for future use. (For practical applications, many or all of the method steps are performed on a computer, having data storage in computer memory or auxiliary storage devices.) It should be sufficient to use a straight ray between source and receiver locations, but if velocity information for the different regions are available from previous iterations, then a bent rays can be used with the trajectory determined by Snell's Law. Any ray tracing tool may be used to compute the raypaths. The raypath distance is the distance along the surface of the earth and could incorporate elevation changes of the surface.

In step 303, all or portions of the seismic trace data are used to simultaneously solve for parameters for two or more surface-consistent components or transfer functions. The solution represents a decomposition of the data into the different components. Each component should represent physical processes that have a filtering or band-limiting effect on the seismic wave, such as source generation or receiver detection effects or propagation through a region of the surface. The source receiver effects are primarily due to the degree of variable coupling of those apparatus units to the Earth, but include any other effects associated with generation of the seismic energy and its partitioning into a ground roll (surface-wave) mode or with detection of the signal from the ground by the receiver if such effects alter the seismic wavelet. A high degree of uniform coupling of sources and receivers to the ground is always sought, but can never be perfectly achieved. The parameters of the surface-consistent components are not media parameters such as the velocity and density for individual depth layers, but represent for the physical process the changes in the waveform for different frequencies. At a minimum, one source component and one propagation component or two propagation components would be included. For example, a source-type filter evaluated at all source locations for the seismic traces being used, and a propagation-type filter for a certain mode of surface-wave propagation evaluated at all cells crossed by the seismic traces being used. Another minimum example might be to include two propagation-type filters each corresponding to a different mode of surface-wave propagation. The components are determined by the best fit between the surface-wave waveforms in the data and that predicted by a model expression (i.e., a mathematical model for the waveform for surface waves after propagation from a specified source location to a specified receiver location through the cell grid defined in step 301), which includes the above-described parameters. The fit is preferably defined by a cost function based on any norm as described above. Any model-optimization method, such as, matrix inversion, conjugate gradient, steepest decent, or Levenberg-Marquardt, can be used to solve for the model parameters. It is helpful to correct the data for known or approximated physical processes or to include them within the model expression. For example, the instrument response, or the input vibrator wavelet can be included. The solution may require the picking of an initial set of model parameters, and any a priori information can be used to determine the initial values. It may also be helpful to window, flatten, scale or normalize the data. Furthermore, transforms can be used for the data and the model and the fit between the data and model compared in the transform domain (e.g., the frequency domain). It may also be useful to provide weights for different offsets. For example, the higher-frequencies will be missing or attenuating at the longer offsets, and so these offsets might be weighted down in their contribution to the cost function. Depending on the specific optimization method, step 303 can be a one step solution or an iterative optimization process although no loop such as 305 is shown in FIG. 3.

In step 304, the goodness of fit is evaluated. Preferably this evaluation is performed in the time domain instead of the frequency domain or other alternative domain used in step 303. If the match to the data is not sufficient, then the process can be repeated (branch 305) with different parameterization starting at step 301. For example, the goodness of fit may indicate lateral variability, and the regions initially defined in step 301 may need to be further subdivided. More components can be included, and/or more modes for the surface-waves. Corrections can be made for higher-order effects such as bent rays or amplitude focusing, defocusing, transmission loses, and scattering. When step 303 is repeated, the model parameters for previous solutions can be used as initial values for the next optimization step.

If in step 304, the match is evaluated to be good, then step 306 is performed. In step 306, the surface-wave waveform for each trace is computed using the appropriate parameters determined in the last iteration of step 303. Note that step 303 may be performed on a subset of the data, but step 306 is performed for every trace in the seismic data set (otherwise the user will have only a partially corrected dataset in the next step). In step 307, the computed surface-wave waveforms are subtracted from the seismic traces. This step can include any type of adaptive subtraction in which small amplitude and phase changes are made to the waveforms to get a better suppression of the surface wave with subtraction. Adaptive subtraction may include computing and applying a match filter to the computed waveforms. Alternately, any other method of modifying the waveforms so that they better match the actual surface-wave recordings can be used.

Step 303

Next, some of the features of the present invention are described in more detail for an example embodiment of the invention. First, a preferred parameterization of the individual surface-consistent components or transfer functions is described. One starts with a trace with source surface coordinates given by (sx,sy) and the receiver surface coordinates (rx,ry). The raypath between (sx,sy) and (rx,ry) is determined to travel across each region j and the travel distance in region j is $x_j$. Then, the model expression for the vertical component $M_v(f,sx,sy,rx,ry, \vec{T})$ is given by $$M_v(f, sx, sy, rx, ry, \vec{T}) = (aoffset)^{-1/2} S(f) R(f) I(f) \quad (7)$$
$$C_v(f, rx, ry) \sum_{n=1}^{N} P_{n,v}(f, sx, sy) e^{-i2\pi f \sum_j^{raypath} s_{n,j}(f) x_j}$$

and the corresponding horizontal component $M_h(f,sx,sy,rx,ry, \vec{T})$ is given by $$M_h(f, sx, sy, rx, ry, \vec{T}) = (aoffset)^{-1/2} e^{i\pi/2} S(f) R(f) \quad (8)$$
$$I(f) C_h(f, rx, ry) \sum_{n=1}^{N} P_{n,h}(f, sx, sy) e^{-i2\pi f \sum_j^{raypath} s_{n,j}(f) x_j}$$

The preceding expressions are for geophones; it is possible to derive similar expressions for other sensors such as accelerometers or hydrophones. In Equations 7 and 8, some components are deterministic, i.e. they can be measured or approximated. The other parameters are unknown and will be obtained by the model optimization of step 303. In the above expressions, the symbol $\vec{T}$ is a vector composed of all the individual component transfer functions, for example the components $C_v$, $P_{n,v}$, $s_{n,j}$ in equation 7.

Deterministic components:

$(aoffset)^{-1/2}$—Amplitude Spreading Factor or divergence correction for a surface wave traveling along a 2D surface (Berkholt, *Applied Seismic Wave Theory*, Elsevier Science Publishers, p. 142 (1987)). The quantity aoffset is the absolute value of the total source to receiver distance given by $\sqrt{(sx-rx)^2+(sy-ry)^2}$.

$S(f)$—Source Wavelet in frequency domain: This an average or characteristic wavelet for the entire survey. Methods to measure it are described below.

$R(f)$—Receiver Impulse Response in frequency domain: This can be obtained from the manufacturer. It represents the average response of the sensors, but if individual sensitivity curves have been measured, they can be used.

$I(f)$—Recording System Impulse Response in frequency domain. This can be obtained from the manufacturer or measured by injecting a spike voltage into the input of the recording system.

$e^{i\pi/2}$—90° phase rotation for horizontal component.

Unknown Components:

$C_v(f,rx,ry)$ or $C_h(f,rx,ry)$—Receiver Coupling for vertical or horizontal sensor, respectively at receiver surface position (rx,ry). This term represents both the variation in sensor sensitivity and the receiver coupling to the ground at location (rx,ry). The receiver or geophone coupling can be described as a complex transfer function (Krohn, "Geophone Ground Coupling", *Geophysics* 49, 722-731(1984)). It can also include an array effect, which could require a source-receiver azimuth dependence. In this implementation it is assumed to be independent of modes, but a receiver coupling term that varies with mode could be used.

$P_{n,v}(f,sx,sy)$ or $P_{n,h}(f,sx,sy)$—Source Coupling and Partition into Mode n for vertical and horizontal sensors, respectively. This is an important lumped parameter. It includes source to source variations and source coupling at location (sx,sy). It also includes the amplitude partition of the source energy into each mode. Each mode can be thought of as an interference of plane-waves traveling within a layered structure forming a waveguide. The layering will selectively propagate different frequencies, and so each mode will have a different amplitude spectrum. Furthermore, the fundamental mode will start at zero frequency, but there will be increasing cut-on frequencies for subsequent modes. (Aki and Richards, *Quantitative Seismology: Theory and Methods Volume I*, W. H. Freeman and Co., 259-318 (1980)). Differences for horizontal and vertical components give rise to different polarization for the different modes.

$s_{n,j}(f)$—Complex slowness for Propagation Across Region j for Mode n. The complex slowness is multiplied by the raypath distance $x_j$ across the cell j. In this implementation, the slowness is made independent of azimuth or direction of propagation. If there is sufficient anisotropy at the site, then an azimuth dependence could be implemented.

The exponential term in equations 7 and 8 is of the form of plane wave propagation $e^{ikx}$ where k is the complex wavenumber (Aki and Richards, op. cit., 173). The wavenumber k can be written as $$k = \frac{2\pi f}{v'} \text{ where } \frac{1}{v'} = \frac{1}{v} + \frac{i}{2vQ}$$

and Q is the effective attenuation quality factor. For each region j, a slowness term $s_{n,j}(f)$ is defined, which includes a real part, the inverse of the phase velocity $v_n(f)$ for surface mode n, and an imaginary part related to the frequency dependent quality factor $Q_n$:

$$\text{real}(s_{n,j}(f)) = \frac{1}{v_n(f)}, \qquad (9)$$

$$\text{imag}(s_{n,j}(f)) = \frac{1}{2Q_n(f)v_n(f)}.$$

The complex slowness is thus a parameter for each propagation components for each region j in Equations 7 and 8.

The current invention solves for the region-dependent earth filter. To fully account for the earth filtering effects on the surface-wave waveform, both velocity and attenuation parameters are preferably included as a function of frequency. Furthermore, for more than one mode, the phase and amplitude effects are coupled and cannot be solved for independently. A vertical profile of the earth velocity or attenuation is not required nor is it estimated at this stage. Instead, only the frequency dependence of both velocity and attenuation is found. Once it is found, then it can be used in step 308 to determine the velocity and attenuation profile.

The ability to approximate the source wavelet S(f) in Equations 1, 4, 5, 7 and 8 can make the model optimization step more robust. In the literature, authors discuss problems and difficulties in knowing the phase of the source wavelet, particularly for vibratory sources (Ziolkowski, "Why don't we measure seismic signatures," *Geophysics* 56, 190-201 (1991); and Gibson and Lamer, "Predictive deconvolution and the zero-phase source," *Geophysics* 49, 379-397 (1984)) Because of these perceived difficulties, a source term has not been included in ground-roll velocity estimation problems and the transfer function approach (Eq. 1) has not been used for ground-roll mitigation. For example, in both previously cited Ernst et al. papers, a source term is not included in the first solution for a phase velocity field.

These difficulties may be handled in the present invention by methods to approximate a source wavelet, and by the source coupling and partition term described above. The source coupling term corrects for the inadequacies in the approximation of the source wavelet. Trantham ("Controlled-phase acquisition and processing," *Soc. Explor. Geophy. Expanded Abstracts* 13, 890 (1994)) showed that the acquisition wavelet can be controlled. Furthermore, Krohn (U.S. Pat. No. 7,436,734) teaches a method to process vibrator data by deconvolving by a vibrator signature based on measurement on the vibrators and shaping the data to a desired impulse response or a wavelet. The vibrator processing wavelet constructed by the method of Krohn is a preferred wavelet to use in this invention for vibroseis data. Alternately, the autocorrelation of the sweep can be used. For data generated with an air gun array, the far-field signature of the air gun can be used. The far-field signature can be measured or it can be modeled from the responses of the individual air guns. Finally, for dynamite data or other data without a source signature, a source wavelet can be constructed using near-offset traces by computing the cross-power spectrum or auto-power spectrum for a time window around the first breaks. The square root of the power spectrum is used as the amplitude of the wavelet. The phase spectrum equivalent to minimum phase for that amplitude spectrum can be computed by standard methods. One method is to obtain the phase by computing the Hilbert transform method of the logarithm of the wavelet amplitude spectrum.

The above unknown components are represented as functions of frequency. The values of these components are estimated for each frequency over the all the frequencies in the ground-roll. Since the ground-roll is band limited and low frequency, the frequency range that needs to be covered is small, for example from 3 to 25 Hz. One way to solve for the unknown components is to solve for the individual frequency values independently, i.e., one frequency at a time. In this embodiment of the invention, the individual parameters for each frequency are the source partition amplitude and phase, the receiver coupling amplitude and phase, and the phase slowness real and imaginary parts. A problem with this approach is that the solution for one frequency may be very different from the next frequency, particularly at the edges of the band when the amplitudes are small. A preferred approach is to constrain the optimization steps so that the components are a smooth function of frequency. One way to do this is to solve not for the individual frequency values but for the coefficients of a polynomial or spline curve that represents the components (see the previously cited Ernst et al. articles). In this case, the inversion is performed simultaneously over a range of frequencies. Another way to reduce the number of unknowns is to link velocity and attenuation parameters by using a causality constraint.

Figure 4:
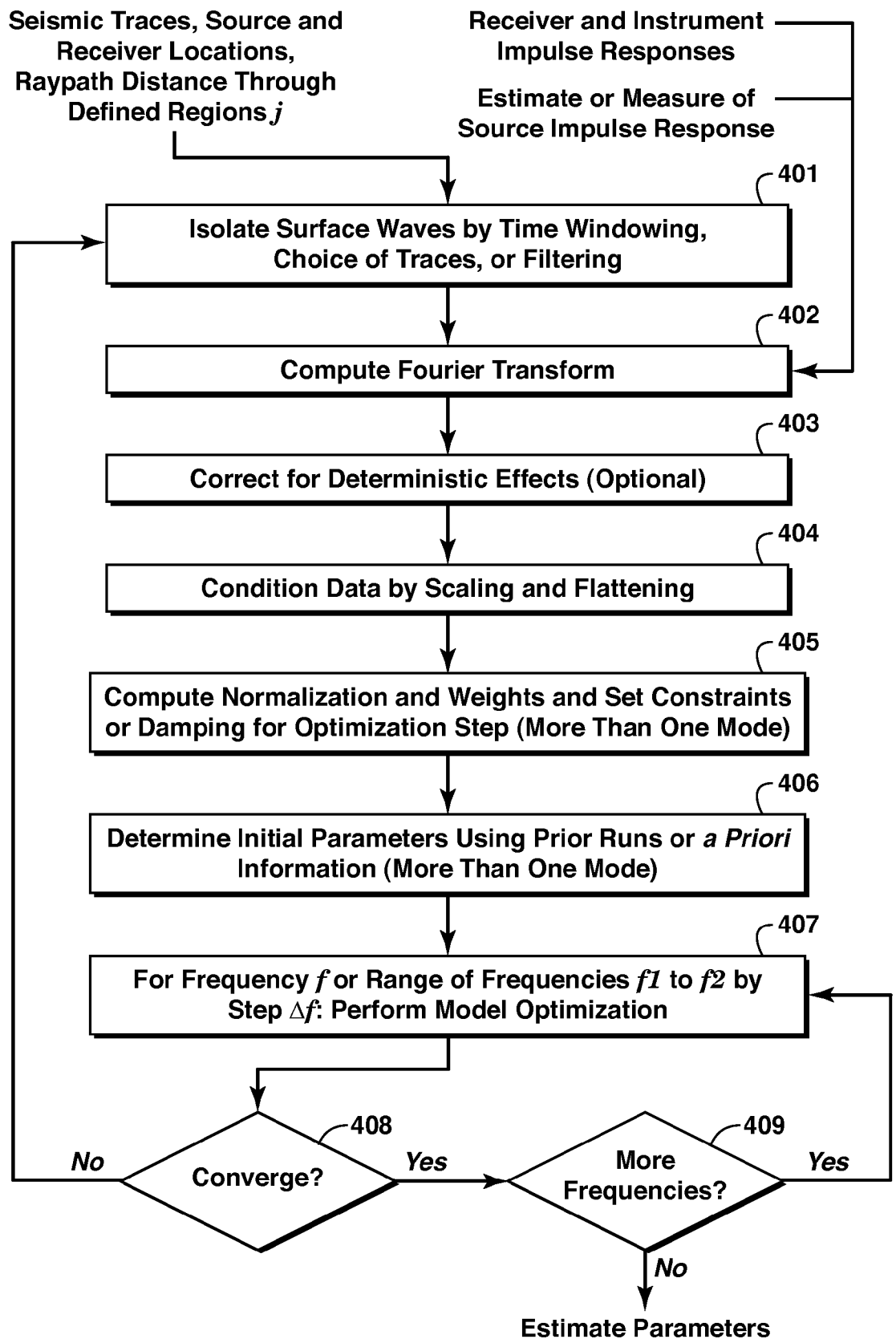
FIG. 4 is a flow chart of steps for performing the model optimization part of FIG. 3 in one embodiment of the invention, wherein surface consistent components (transfer functions) governing surface wave propagation are generated.

A preferred way to perform step 303 is now described and detailed in FIG. 4. In this implementation, the inputs to the solution step 303 are the seismic traces with source and receiver locations and the path lengths across each region for each trace. In addition, as part of step 303, measurements or approximations of the recording system, the sensor, and the source impulse responses (wavelet) are obtained. The method may be used for only vertical traces, for only horizontal traces, or for both together. An expression may also be derived for pressure sensors or accelerometers, as well.

In step 401 of FIG. 4, the surface-waves are isolated by a time window. The purpose is to limit the interference from other events such as reflections or first arrivals. Also the offset range or the traces to be used can be limited. The longer offsets may be missing high frequencies and tests may reveal that they are less useful. Also, the small offsets may be not useful because they are in the near field of the source. Other methods of isolating or enhancing the surface-waves can be used such as filtering, cross-correlating with a reference trace, interferometric operations of cross-correlating and stacking, etc.

In step 402, the data and the supplied impulse responses are Fourier transformed into the frequency domain. Alternatively, the data can be left in the time domain or transferred into some other domain. For example, $f$-k domain, wavelet domain, Gabor domain, or radon domain.

In step 403, the data traces in the frequency domain D($f$) are divided by the deterministic components ((aoffset)$^{-1/2}$, S($f$), I($f$), and R($f$),$e^{-\pi/2}$) and stored as D(f). This is optional;

the purpose is to avoid multiplying by these terms each time the model traces Eq. 7 and Eq. 8 are computed.

Now Equations 7 and 8 can be written with the known parameters removed $$M'_v(f, sx, sy, rx, ry, \vec{T}) = \quad (10)$$
$$C_v(f, rx, ry) \sum_{n=1}^{N} P_{n,v}(f, sx, sy) e^{-i2\pi f \sum_j^{raypath} s_{n,j}(f) x_j}$$

and $$M'_h(f, sx, sy, rx, ry, \vec{T}) = \quad (11)$$
$$C_h(f, rx, ry) \sum_{n=1}^{N} P_{n,h}(f, sx, sy) e^{-i2\pi f \sum_j^{raypath} s_{n,j}(f) x_j}.$$

In step 404, it is helpful to further condition the data and the parameters. It is useful to flatten the data using a single value of the average ground-roll slowness $s_0$ or inverse velocity. The data are multiplied by the phase term $e^{i2\pi(offset)s_0}$ to flatten the data, and all slowness parameters are adjusted appropriately. Furthermore it is helpful to use distance units of 10 km and to scale the amplitudes of the data so that all the unknown parameters have similar numerical values, i.e. in the range of 1-10, so that the model optimization step can better update each one. Other ways of data regularization may be advantageous.

When there is one mode, the model optimization step is linear; when there is more than one mode it is nonlinear. As those familiar with model optimization know, a nonlinear optimization may need constraints or damping terms (Step 405) and an initial set of parameters (Step 406). It is useful to constrain the source and receiver coupling amplitudes to be positive numbers. Also, to keep the cost function from being too small initially, it is helpful to normalize the cost function at each frequency by dividing it by the average rms amplitude of the data traces. Furthermore, as discussed above it may be preferable to apply damping or to re-parameterize the components as splines so that the components are smoothly varying with frequency. Weights for the different offsets or trace amplitude normalization may also be useful. It may be preferable to make the longer offsets more important by, for example, dividing the cost-functions by the square root of offset. The higher-order modes are more dominant on longer offsets, so a mode-dependent offset weighting could be useful. If the amplitudes of the traces in the survey are highly variable, the cost functions can be normalized using the trace amplitudes to make all traces contribute more equally to the solution. The initial values (step 406) can be set using measurements made on the data using $f$-$k$ analysis or other measurements or information. If the optimization step is being repeated, then the previous values can be used.

The optimization step 407 is done one frequency at a time or one group of frequencies at a time. Specific methods of implementing step 407 are described below. At the end of each group, the size of the total residue (the value of the cost function) is evaluated to determine whether or not there has been a convergence to a solution (Step 408). If not then new values may be picked for offset range, scaling, normalization, etc. If a good solution has been obtained, then the optimization is done for more frequency groups (Step 409).

Step 407: One Mode Solutions

When there is only one mode of ground roll, a determination that the skilled practitioner will be able to make from the seismic data, then the optimization problem is linear with respect to the parameters, and the amplitude and phase components can be separated and solved for independently. Even when there is more than one mode, it may be useful to try the one-mode solution to help set the initial parameters, particularly at the low-frequencies before the cut-on frequency of the higher order modes. When there is only one mode, then Equation 8 becomes $$M'_v(f, sx, sy, rx, ry, \vec{T}) = \quad (12)$$
$$C_v(f, rx, ry) P_v(f, sx, sy) e^{-i2\pi f \sum_j^{raypath} s_j(f) x_j}.$$

A similar expression can be generated for the other vector components, i.e. horizontal wave motion. Because there is no sum over the modes, the amplitude and phase components can be separated and solved for independently. Using A for amplitude and taking the logarithm of the amplitudes and $\Phi$ for phase and unwrapping the phase, one gets the following:

$$\log A(M'_v(f, sx, sy, rx, ry, \vec{T})) = \log A(C_v(f, rx, ry)) + \quad (13)$$
$$\log A(P_v(f, sx, sy)) + \left(2\pi f \sum_j^{raypath} \text{imag}(s_j(f)) x_j\right)$$

$$\Phi(M'_v(f, sx, sy, rx, ry, \vec{T})) = \quad (14)$$
$$\Phi(C_v(f, rx, ry)) + \Phi(P_v(f, sx, sy)) - \left(2\pi f \sum_j^{raypath} \text{real}(s_j(f)) x_j\right)$$

The cost term for the amplitude and phase terms becomes:

$$\sum_{i=1}^{ntraces} |\log(A(D_i(f, sx, sy, rx, ry))) - \quad (15)$$
$$\log(A(M'(f, sx, sy, rx, ry, \vec{T})))|^2 = \min$$

$$\sum_{i=1}^{ntraces} |\Phi(D_i(f, sx, sy, rx, ry)) - \Phi(M'(f, sx, sy, rx, ry, \vec{T}))|^2 = \min \quad (16)$$

The solution can be obtained using standard linear techniques, such as matrix inversion, conjugate gradient methods, or singular value decomposition. With only one region and neglecting the receiver coupling terms, then linear regression can be used to solve for the amplitude and phase parameters of the source and the one region.

Step 407: Multi-Mode Solutions

When there is more than one mode then the optimization step is non-linear. The amplitude and phase terms are coupled and cannot be separated. In this case, one may assume a particular number of modes (two or more) and use the full cost function based on the real and imaginary parts of the data given by Equation 6. The goal is to solve for the full multi-mode component vector $\vec{T}(f)$. Since the problem is non-linear, a non-linear optimization code such as Levenberg Marquardt, steepest decent or a Newton method, is required. The Levenberg-Marquardt method may be preferred; it is fast and stable. It is particularly helpful to supply analytical forms of the derivatives of the cost function or the Jacobian. These methods are iterative. They require an initial model, and the solution iteratively updates the model to improve the match with the data. All of these iterations are within the step 303 in the flow chart of FIG. 6. It may be useful to start with a small number of modes, solve the solution for the smaller number of modes, then to branch (306) back to the beginning, use the parameters previously determined and add new parameters for the higher-order modes for the next solution of step 303. The whole process can be repeated as many times as needed to obtain a best match to all modes of the surface wave.

Step 406: Scattered Surface Waves

The above-described embodiment of the present invention allows the prediction (Step 306) and removal (307) of the direct ground roll with a straight-line path from source to receiver. In addition, it will determine at each frequency the source and receiver coupling parameters and the propagation (velocity and attenuation) parameters for each region. These parameters can be used to estimate and remove scattered ground-roll in a second iteration or with a second method. Such a second method can be a migration or imaging approach in which the data minus the surface waves are migrated with the phase velocity field to image the scatters. Then the scattered wavefield is predicted and removed. An alternative for the second method is to use inversion to solve for the scattered wavefield directly. For example, the method of Ernst, et al. (op. cit. (2002)) could be used to image the scatterers in the near surface using the improved phase velocity and source functions found in this method. Preferably however, the process described in FIG. 3 is used with a different parameterization for the scattered surface waves for subsequent iterations.

Figure 5:
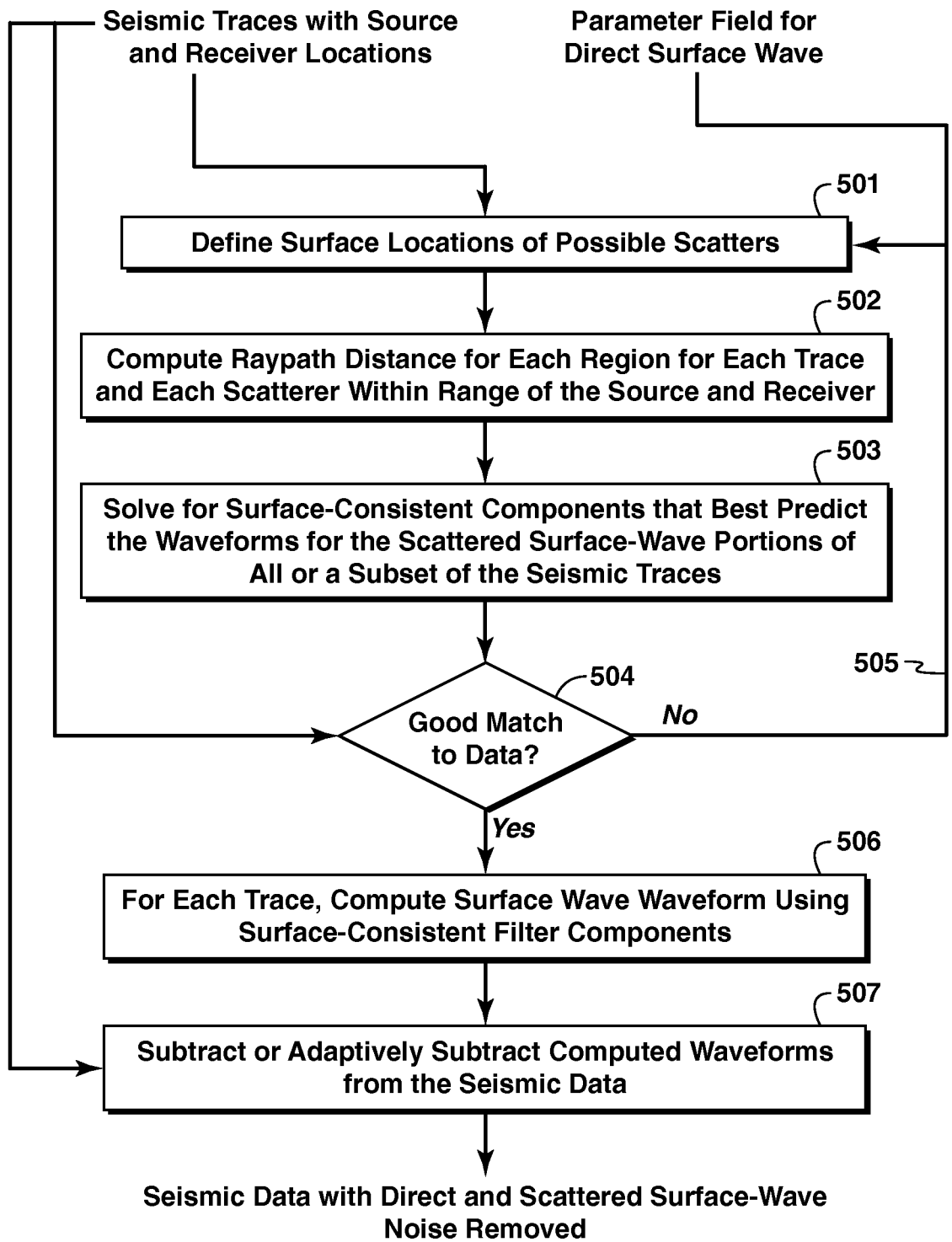
FIG. 5 is a flow chart showing basic steps in an embodiment of the invention wherein scattered surface waves are treated as well as direct surface waves.

In this preferred method, the method of FIG. 3 is used to solve for the initial parameters $\vec{T}(f)$ for the direct ground-roll mode. Then branch 305 is used to perform more iterations, this time to solve for scatters. The modifications for scatters are illustrated in FIG. 5. Now a new expression for a model trace is developed from Equation 8. The new model $M_v''(f, sx, sy, rx, ry, \vec{T}, \chi)$ trace is the sum of the direct ground roll $M_v''(f, sx, sy, rx, ry, \vec{T})$ described in Equation 8 and a scattered wavefield. In step 501, the surface locations of the scatters g are defined. They can be the center of a fine grid of scattering locations or they can be located at known topography changes or surface features. In this expression, an unknown term is a new model parameter called the contrast of the scattering $\chi(f,g)$. This parameter relates to the relative amplitude of the surface-waves scattered at a particular location compared to the incoming direct wave. If there is no contrast—i.e. the media is homogenous then there is no scattering. A bigger difference in media properties scatters more energy. Here, we are not solving for the particular media contrast but the effect—how much is scattered. The new model trace is then given by $$M_v''(f, sx, sy, rx, ry\vec{T}, \chi) = M'(f, sx, sy, rx, ry, \vec{T}) + C_v(f, rx, ry) \quad (17)$$

$$\sum_{g=1}^{G} \left( \sum_{n=1}^{N} P_{n,v}(f, sx, sy) \chi(f, g) e^{-i2\pi f \sum_{j}^{raypath\_G} s_{n,j}(f \kappa_j)} \right)$$

where, the raypath_G is a raypath for each scatter g. In step 502, the raypath distance across each region is computed for each trace and each point g. In this case the raypath is from source to scattering point g to receiver. Given an expectation for the traveltime for scattering arrivals, then scatters too far from the source and the receivers do not need to be included since they will arrive too late. Note in Equation 12, the vector values $\vec{T}$ are known. In step 503, a solution is sought for the scattering contrast $\chi(f,g)$, with iterative optimization represented by steps 504 and 505. It may be important to make the contrast a function of source-to-receiver azimuth. For a small number of scatters, an alternative parameterization can be used in which step 303 updates the locations of the scatters and corrects the raypaths as well as solves for the contrast. Finally in step 506, the total direct ground roll and scattered ground roll are computed and subtracted from the data in step 507.

EXAMPLES

A couple of examples of the estimation of ground-roll waveforms are shown here. These are examples for computer simulated data using a full 3D viscoelastic wave-equation solution for flat layers. The simulation was performed with a 20-Hz Ricker source wavelet. Because the model is of flat layers, there is no lateral variation in soil types, so there is only one region. Also, there are no receiver coupling variations. In these simple examples, the parameterization reduces to two components: the source and propagation terms for each mode.

Figure 6:
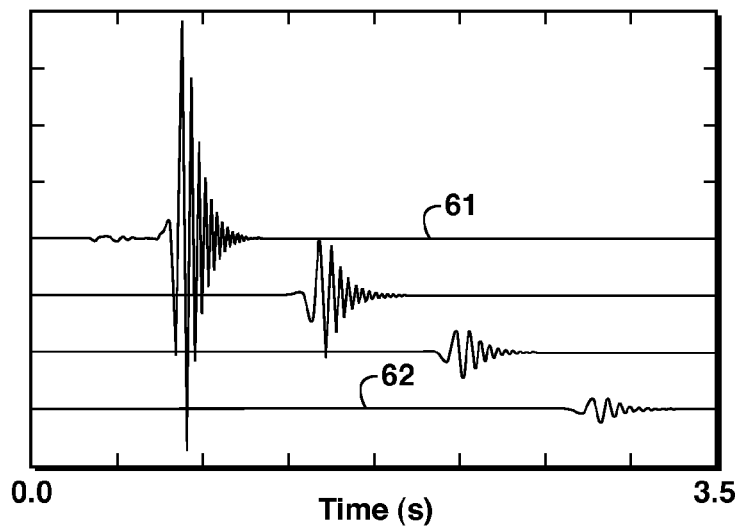
FIG. 6 shows four traces, each corresponding to a different source-to-receiver distance (offset), for a full wave-equation computer simulation of surface waves for a single thin earth layer over a half space.
Figure 7A:
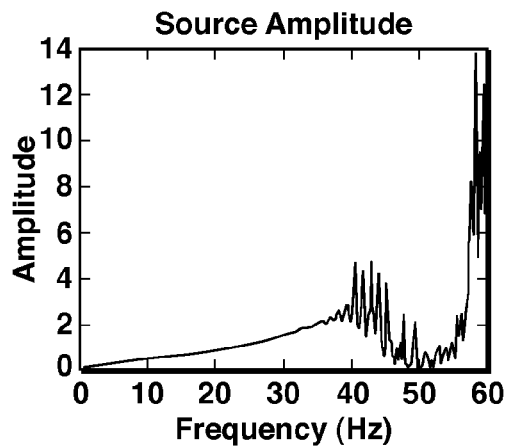
FIGS. 7A-D show the result of model optimization for the example of FIG. 6 wherein the waveform changes have been decomposed into complex (amplitude and phase) source and propagation components as a function of frequency.
Figure 7C:
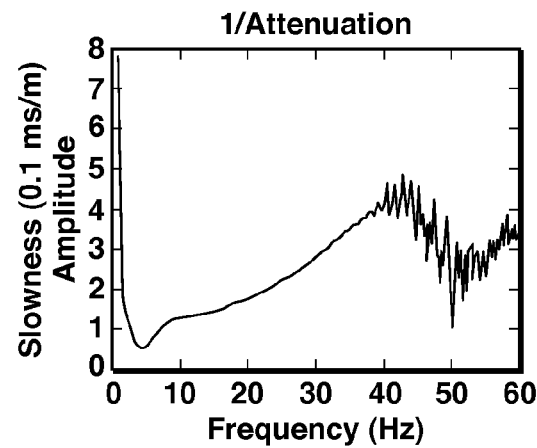
Figure 7B:
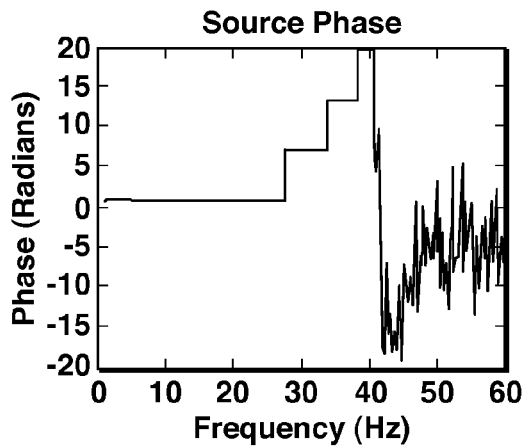
Figure 7D:
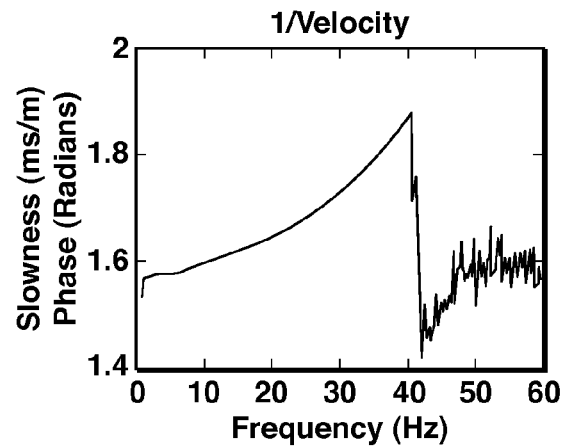

The first example is a single 5-m thin layer over a half space. There is only one surface-wave mode, which is dispersive, as shown in FIG. 6 for four source to receiver distances (offset) ranging from 500 m (61) to 2,000 m (62) in uniform increments of 500 m. These represent a few traces from the seismic data input for step 301. The outputs of the model optimization step 303 are shown in FIGS. 7A-D. These include the source partition amplitude (7A) and phase (7B) and the real (7C) and imaginary (7D) parts of the slowness. Each of these parameters is a function of frequency. It may be noted also that the source partition parameter is not the 20-Hz Ricker wavelet, but is the correction for partition into the ground-roll mode. From these parameters, the predicted ground-roll (step 306) is shown in FIG. 8 for the same four offsets as in FIG. 6. They are a perfect match to the surface-wave part of the data shown in FIG. 6.

The second example is a simulation from a complex near-surface with a large velocity gradient composed of 20 layers. The waveforms (FIG. 9A) show complex interference of multiple modes and the $f$-k spectra (FIG. 9B) indicate the presence of up to 6 modes with their own velocity dispersion and amplitude behavior. The slowest mode or fundamental mode 801 starts at 0 Hz, but subsequent modes have increasing cut-on frequencies. The cut-on frequency for the $3^{rd}$ mode is marked as 802. The velocities and amplitudes were picked on the $f$-k spectra and were used as initial models. The linear method was used for the first mode, and then subsequent solutions were performed with the nonlinear method adding two modes at a time.

Figures 11A, 11B:
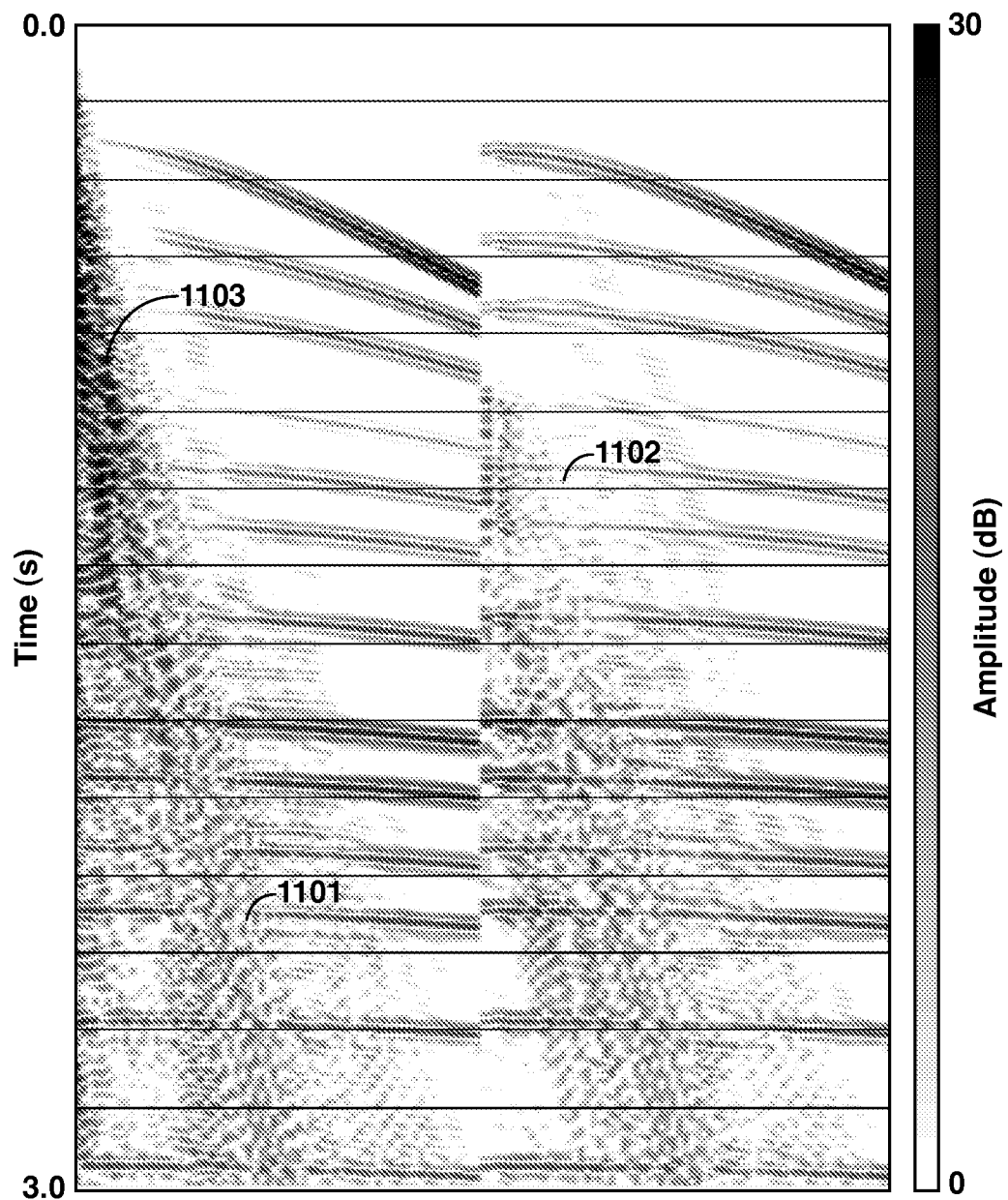
FIGS. 11A-B show filtering of the seismic data in FIGS. 10A-B by a conventional method.

FIGS. 10A-B show a simulated 3D shot gather computed for both reflections (1001) and surface-waves (1002 and 1003). The gather included a receiver line inline with the shot (FIG. 10A) and a receiver line offset from the shot (FIG. 10B). These drawings illustrate input data for step 301 of FIG. 3. Conventional multi-trace filters typically are less successful for offset cables in which the ground-roll appears hyperbolic (1003). The data trace spacing is 15 m, and the surface waves are aliased. Prior art results (U.S. Pat. No. 5,781,503 to Kim) are shown in FIGS. 11A-B. The trace spacing is too coarse to protect the reflectors, and they are removed (1101 and 1102) along with the ground roll. Also, not all of the ground-roll is removed particularly at the small offsets (1103).

Figure 12:
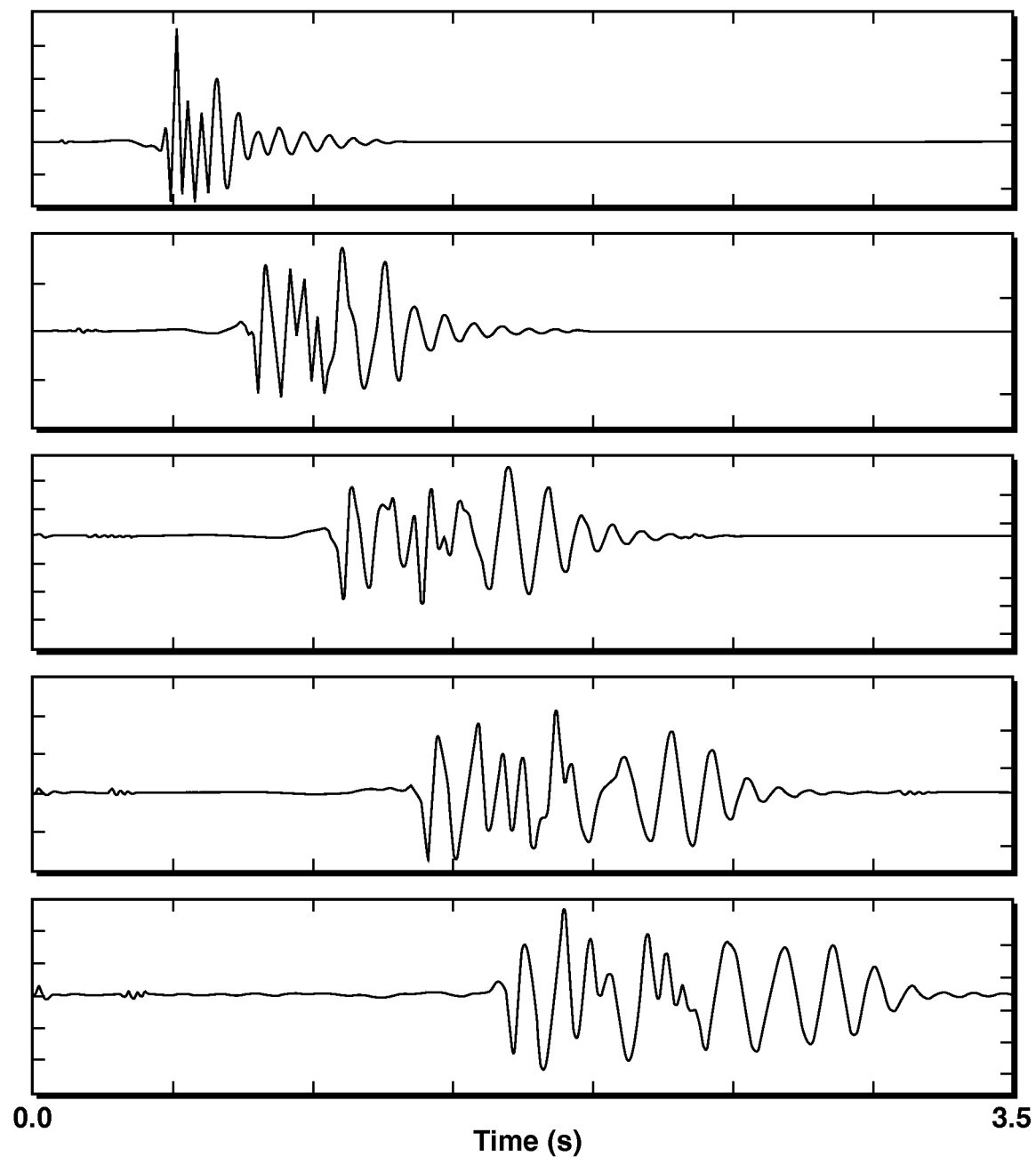
FIG. 12 shows five sample traces from FIG. 11A, each trace at different source-to-receiver distance (offset)—because up to 6 ground-roll modes are present, the waveforms are complicated.
Figure 13:
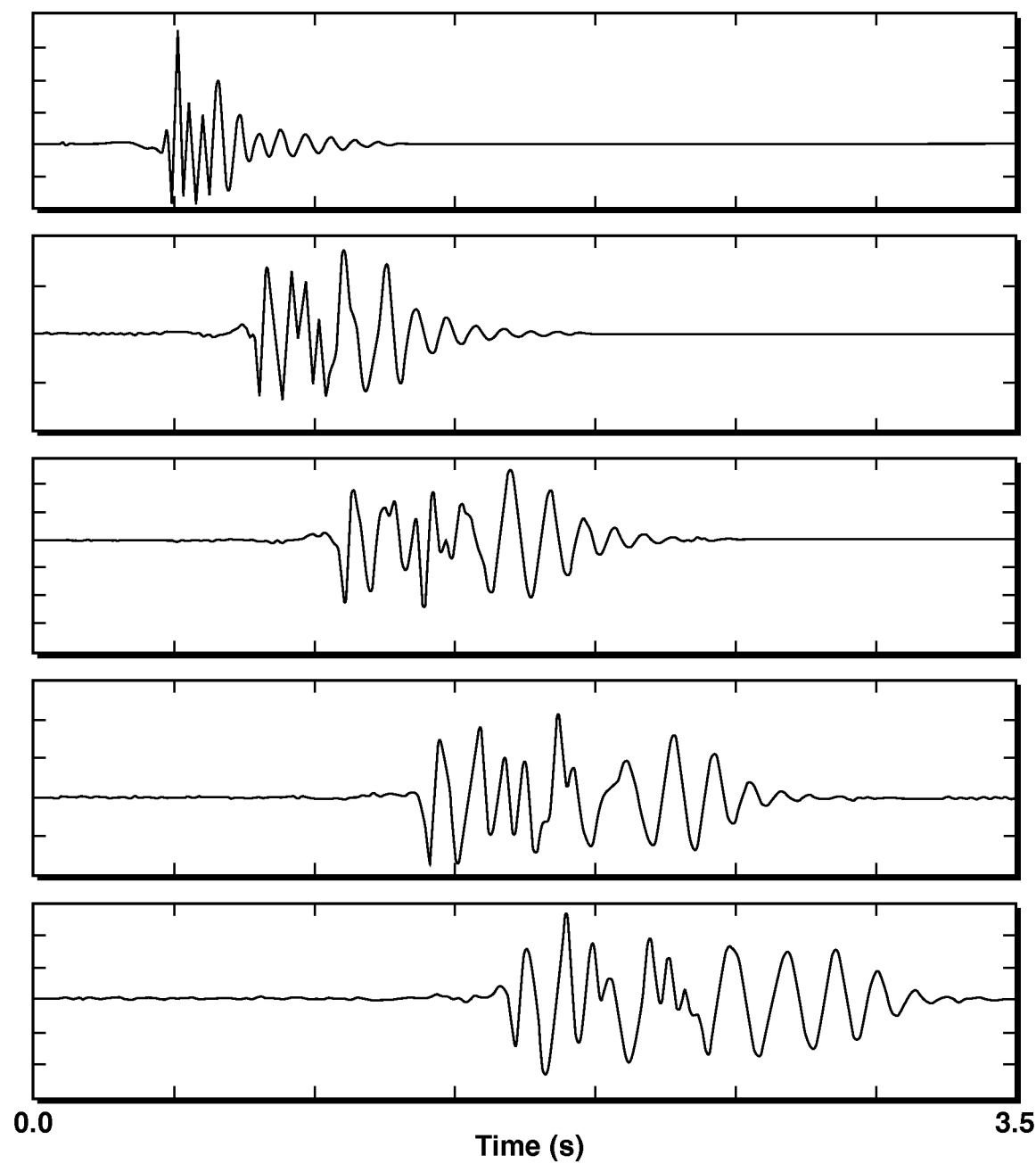
FIG. 13 shows the predicted waveform output for the five sample traces in FIG. 12.

FIG. 12 shows five traces extracted from FIG. 10A corresponding to offsets ranging from 100 m (top) to 500 m (bottom) in 100 m increments. FIG. 13 shows the predicted waveforms (step 306) for the same five traces. They are an excellent match. The waveforms illustrate the complexity of the waveforms and the interference of multiple modes. The model expression with all six modes is able to reproduce the full complexity of the waveforms. It takes a multiple mode solution to accurately represent the waveforms. FIGS. 14B-F respectively show the inclusion of one, two, three, four and six modes in the computation of step 306 which may be compared to the original data trace, shown in FIG. 14A. Including only one mode (14B) matches the back, slower part of the waveform. Four modes (14E) are a good match, and six modes (14F) match very well. Finally, FIGS. 15A-B show the output of step 307, after subtraction of the estimated waveforms from the data in FIGS. 10A-B. The ground-roll has been attenuated by approximately 30 dB, and the reflections are unharmed.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims.

The invention claimed is:

1. A method for determining physical structure or a physical property of a subsurface earth region from seismic survey data by removing surface-wave noise from seismic data traces, said data traces corresponding to at least one source location and a plurality of receiver locations in a seismic survey of the subsurface region, said method comprising:
   (a) dividing a near-surface part of the subsurface region into one or more cells;
   (b) simultaneously solving for at least two types of surface-consistent components of the seismic traces, wherein a surface-consistent component characterizes filtering effects either of propagation of a seismic surface wave mode across a cell, called a propagation filter, or due to generation of surface wave energy at a source location, called a source filter or due to receiving of surface wave energy at a receiver location, called a receiver filter, and wherein a "type" of surface-consistent component is one of (i) a propagation filter for one surface wave mode, evaluated at all cells crossed by any of the seismic traces; (ii) a source filter, evaluated at all source locations for the seismic traces, or (iii) a receiver filter, evaluated at all receiver locations for the seismic traces; and
   (c) computing a surface-wave waveform using said surface-consistent components;
   (d) transforming the seismic data by subtracting or adaptively subtracting the computed surface-wave waveform from the seismic data traces; and
   (e) using the seismic data after surface-wave noise removal to determine physical structure or a physical property of the subsurface earth region;
   wherein at least (b)-(d) are performed using a computer.

2. The method of claim 1, further comprising using the determined physical structure or physical property for hydrocarbon assessment of, or extraction from, the subsurface earth region.

3. The method of claim 1, further comprising in (b), for some or all of the traces and corresponding seismic source and receiver locations, computing the raypath distance across each intervening cell from the source location to the receiver location, and wherein the solution for surface-consistent components optimizes said components by a single comparison or iterated comparisons of data traces from the seismic survey and surface-wave predictions computed using assumed or iteratively updated components along with the computed raypath distances.

4. The method of claim 1, wherein the surface-consistent components are complex functions of frequency, i.e. functions having a real part and an imaginary part.

5. The method of claim 1, wherein at least two distinct modes are identified in the seismic data, and the surface-consistent components include parameters for multi-mode propagation of surface-waves.

6. The method of claim 5, wherein the distinct modes are identified from the data after the data are transformed into a frequency domain or a frequency-wavenumber domain.

7. The method of claim 1, wherein the surface-consistent components are also a function of azimuth or propagation direction.

8. The method of claim 1, wherein the surface-consistent components include parameters for velocity dispersion or attenuation.

9. The method of claim 1, wherein the solution is obtained in (c) by minimizing a cost function involving the sum over a group of traces of the difference between a model expression, which is a function of said surface-consistent components, and the survey data.

10. The method of claim 1, wherein a model optimization algorithm is used in solving for said surface-consistent components, wherein the model is a model of a waveform for either a single ground roll mode or for multiple modes.

11. The method of claim 1, wherein solving for said surface-consistent components involves using one or more of constraints, damping, normalization, weights, and regularization.

12. The method of claim 1, wherein the seismic data are conditioned by windowing, by filtering, by cross-correlation filtering, or by cross-correlation, then followed by stacking or by transforming the data into a domain other than the space-time domain in which the data were recorded.

13. The method of claim 4, wherein the complex surface-consistent components include source amplitude and phase, and a complex slowness for each cell crossed by the trace raypath and for each ground-roll mode being treated.

14. The method of claim 1, further comprising:
   (i) using the solution for the surface-consistent components to image or to invert for scattered surface waves;
   (ii) for each trace, computing scattered surface-wave waveforms; and
   (iii) subtracting or adaptively subtracting the scattered surface waves from the seismic data.

15. The method of claim 1, further comprising:
   (i) defining surface locations for scatterers of surface waves;
   (ii) for each trace and corresponding seismic source and receiver locations, computing the raypath distance across each intervening cell from the source location to one or more scatterer locations and then to the receiver location;
   (iii) solving for surface-consistent scatterer components for the scatterers that predict waveforms for scattered surface waves in the seismic data; and
   (iv) using in (d) said surface-consistent scatterer components together with the surface-consistent components from (c), thereby computing surface-wave waveforms that include both direct and scattered waves.

16. The method of claim 1, wherein at least one of the surface-consistent components is a transfer function in frequency domain or an impulse response in time domain.

17. The method of claim 3, further comprising repeating steps (a)-(b) at least once, wherein the cell division in (a) is changed to improve consistency between predicted and survey data waveforms.

18. The method of claim 1, wherein the components for each trace consist of a source component, a receiver component, and a component for each cell crossed in the raypath from the source to the receiver.

19. A method for producing hydrocarbons from a subsurface region, comprising:
   (a) obtaining physical structure or a physical property determined from data from a seismic survey of the subsurface region using a method as described in claim 1; and
   (b) drilling a well into the subsurface region based at least in part on said physical structure or physical property, and producing hydrocarbons from the well.

20. A method for removing surface-wave noise from seismic data, comprising estimating a plurality of surface-consistent transfer functions in frequency domain, or alternatively estimating impulse responses in time domain, that characterize changes in surface wave waveforms caused by filtering effects as they are transmitted by a source and are propagated through a medium to be recorded at a receiver, and using the estimates to predict surface-wave waveforms using a computer, and then subtracting the predicted surface waves from the seismic data.

* * * * *